United States Patent
Michaeli et al.

(10) Patent No.: US 7,499,941 B2
(45) Date of Patent: Mar. 3, 2009

(54) PIPELINE REGULAR EXPRESSION MATCHING

(75) Inventors: Amir Michaeli, Givat Shapira (IL); Niv Margalit, Ramat-Hasharon (IL); Ofer Bardan, Kefar Saba (IL); Meir Schreiber, Maccabim (IL)

(73) Assignee: Cisco Technology, Inc., San Jose, CA (US)

( * ) Notice: Subject to any disclaimer, the term of this patent is extended or adjusted under 35 U.S.C. 154(b) by 549 days.

(21) Appl. No.: 11/220,082

(22) Filed: Sep. 5, 2005

(65) Prior Publication Data
US 2007/0055664 A1    Mar. 8, 2007

(51) Int. Cl.
*G06F 17/30* (2006.01)
(52) U.S. Cl. .................... 707/102; 707/101
(58) Field of Classification Search .............. 707/1–10, 707/100–104.1, 200–206
See application file for complete search history.

(56) References Cited

U.S. PATENT DOCUMENTS

| 4,241,402 | A | 12/1980 | Mayper, Jr. et al. |
| 6,263,333 | B1 | 7/2001 | Houchin et al. |
| 6,571,243 | B2 | 5/2003 | Gupta et al. |
| 6,856,981 | B2 | 2/2005 | Wyschogrod et al. |
| 6,892,237 | B1 | 5/2005 | Gai et al. |
| 6,952,425 | B1 | 10/2005 | Nelson |
| 2003/0051043 | A1 | 3/2003 | Wyschogrod et al. |
| 2003/0177253 | A1 | 9/2003 | Schuehler et al. |
| 2003/0221013 | A1 | 11/2003 | Lockwood et al. |
| 2004/0049596 | A1 | 3/2004 | Schuehler et al. |
| 2004/0059443 | A1 | 3/2004 | Sharangpani |
| 2005/0086520 | A1 | 4/2005 | Dharmapurikar et al. |
| 2007/0130140 | A1* | 6/2007 | Cytron et al. ............ 707/6 |

OTHER PUBLICATIONS

Ken Thompson, "Programming Techniques," ACM, vol. 11, No. 6, Jun. 1968, pp. 419-422.
Wu et al., "A Sub-Quadratic Algorithm for Approximate Regular Expression Matching," Journal of Algorithms, vol. 19, Issue 3, 1995, pp. 1-14.
M. Barrio, P. de la Fuente, and J. Vegas, A Recursive Version of the Shift Or Algorithm, Proceedings of the 14th IASTED, IASTED Acta Press, 1996, pp. 15-18.
R. Baeza-Yates and G. Gonnet, A New Approach To Text Searching, Communications of the ACM, 35(10), pp. 74-82, 1992.

(Continued)

*Primary Examiner*—Diane Mizrahi
(74) *Attorney, Agent, or Firm*—The Law Office of Kirk D. Williams

(57) ABSTRACT

Regular expression matching is performed on a sequence of characters using a pipeline architecture of regular expression matching stages. Multiple regular expression matching stages are connected together in a pipeline manner, with each of these regular expression matching stages corresponding to a different portions of the regular expression. These stages are response to indications from their immediately preceding stages (if they have a preceding stage) of whether or not a progressive match was determined. If all preceding stages matched for corresponding characters of the sequence of characters, then a stage will identify whether or not the current character matches its programmed portion of the regular expression to a next stage or to another device (e.g., the final stage may indicate to a packet processor whether or not the regular expression is matched).

37 Claims, 21 Drawing Sheets

OTHER PUBLICATIONS

Robert S. Boyer and J. Strother Moore, A Fast String Searching Algorithm. Communications of the ACM, 20 (10), pp. 762-772, 1977.

Merrill E. Isenman and Dennis E. Shasha, Performance and Architectural Issues for String Matching, IEEE Transactions on Computers, vol. 39, No. 2, Feb. 1990, pp. 238 250.

Josue Kuri and Gonzalo Navarro, Fast Multipattern Search Algorithms for Intrusion Detection, Proceedings of the Seventh International Symposium on String Processing and Information Retrieval (SPIRE '00), IEEE, 2000, 12 pages.

C. Jason Coit, Stuart Staniford, and Joseph McAlerney, Towards Faster String Matching for Intrusion Detection or Exceeding the Speed of Snort, Proceedings of the Darpa Information Survivability Conference and Exposition (DISCEXII '01), IEEE, 2001, 7 pages.

Peter C. Wayner, Using Content-Addressable Search Engines to Encrypt and Break DES, Computer Science Department, Cornell University, 1991, 11 pages.

Schuehler et al., "Architecture for a Hardware-Based, TCP/IP Content-Processing System," vol. 24, No. 1, Jan. 2004, pp. 62-69.

U.S. Appl. No. 10/340,392, filed Jan. 10, 2003, Panigrahy et al.

U.S. Appl. No. 11/144,476, filed Jun. 3, 2005, Williams et al.

* cited by examiner

**MATCHING A CHARACTER

MATCHING USING '?'
(ZERO OR ONE)

MATCHING USING '+' (ONE OR MORE)

MATCHING USING '*'
(ZERO OR MORE)

MATCHING USING '!'
(NOT MATCHING A CHARACTER)

MATCHING UPPER OR LOWER CASE OF A CHARACTER

'OR' OPERATION AMONG MULTIPLE STAGES

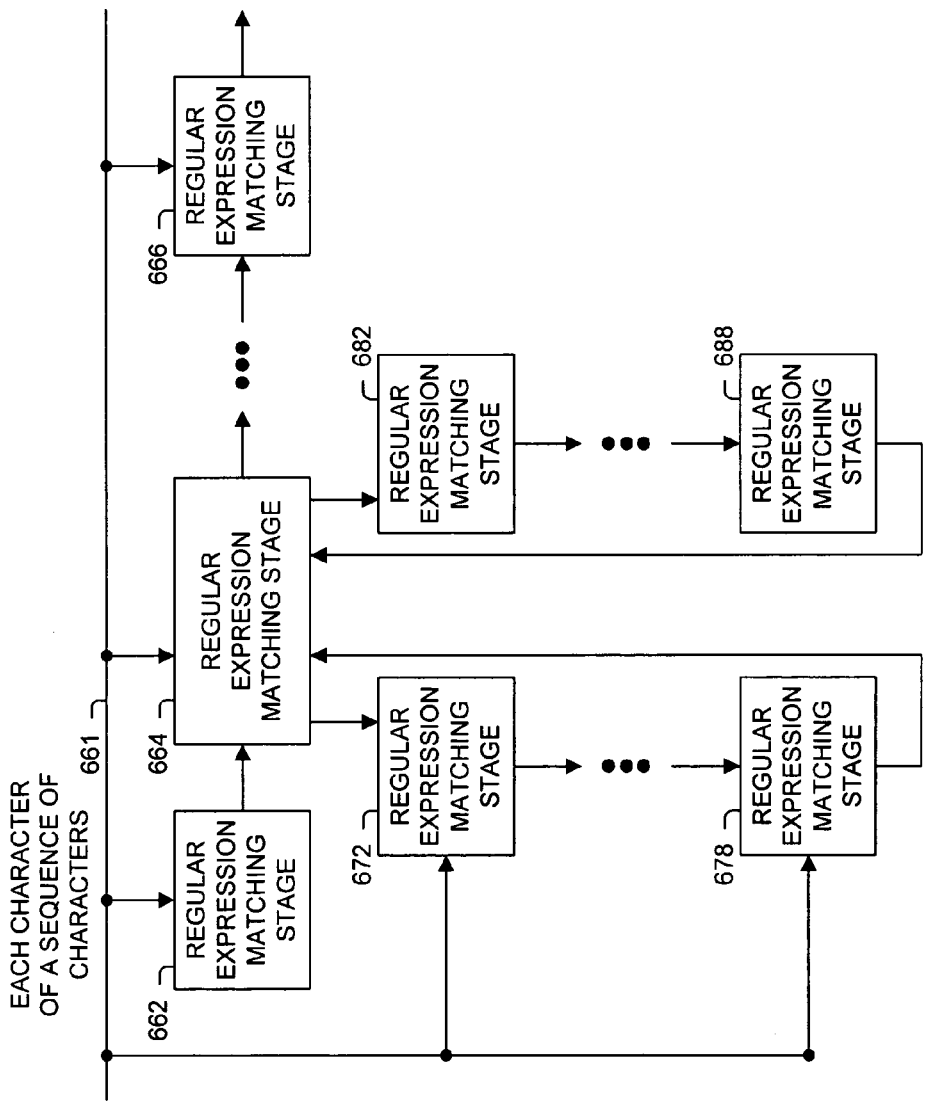

PIPELINE REGULAR EXPRESSION MATCHING

TECHNICAL FIELD

One embodiment of the invention relates to communications and computer systems, especially computers, routers, packet switching systems, and other devices; more particularly, one embodiment relates to regular expression matching of a sequence of characters using a pipeline architecture of regular expression matching stages, which may be particularly useful in certain in computer and communications systems, such as for, but not limited to, the processing of packets.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

Regular expression matching is becoming a common operation to be performed at high speeds. For example, URLs may need to be located in Layer 7 (L7) packet headers only if they match a set of regular expressions to classify the sessions appropriately. Similarly, regular expression matching is used for intrusion detection, security screening (e.g., whether an email or other message contains certain patterns of keywords), load balancing of traffic across multiple servers, and array of many other applications.

A problem, especially for high speed applications, is the rate at which matching can be performed, as well as the space required to store the match identification data structure. A common method to match common expressions is to convert them to a deterministic finite automaton (DFA). The use of DFAs for regular expression matching which produces a set of matched regular expressions upon reaching a final state is well-known. From one perspective, a DFA is a state machine which processes characters of an input string, and upon reaching a final state, generates a list of one or matched regular expressions. If multiple regular expressions are to be simultaneously matched against, then the DFA for each of the different regular expressions is traversed, or the DFAs are multiplied together to form a single combined DFA which is traversed to identify the matching regular expression or expressions. However, when a regular expression contains a closure, the number of states required for a DFA and for combined DFA can explode (i.e., greatly increase), thus consuming a lot of resources. Also, the memory requirements and speed at which these DFAs may be traversed may not meet the needs of certain applications, especially some high-speed applications.

SUMMARY OF THE INVENTION

Disclosed are, inter alia, methods, apparatus, data structures, computer-readable media, and mechanisms, for regular expression matching of a sequence of characters using a pipeline architecture of regular expression matching stages, which may be particularly useful in certain in computer and communications systems, such as for, but not limited to, the processing of packets. One embodiment includes multiple regular expression matching stages connected together in a pipeline manner. Each of these regular expression matching stages corresponds to a different portion of the regular expression. In one embodiment, a first stage receives and processes characters in order to identify whether or not its respective portion of the regular expression is matched, and provides such indication to its immediately subsequent stage. The other stages, in response to its immediately preceding stage indicating a match for its stage and all preceding stages for corresponding characters, signals the result of whether or not the current character results in a match of its stage to a next stage or to another device (e.g., the final stage may indicate to a packet processor whether or not the regular expression is matched). In one embodiment, multiple regular expression matching pipelines can be connected together in different configurations for processing different regular expressions.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 5 and 6A-C are a block diagrams of exemplary regular expression matching mechanisms with multiple regular expression matching stages connected in a pipeline manner that can be used independently or in conjunction in one embodiment;

DETAILED DESCRIPTION

Figure 1:
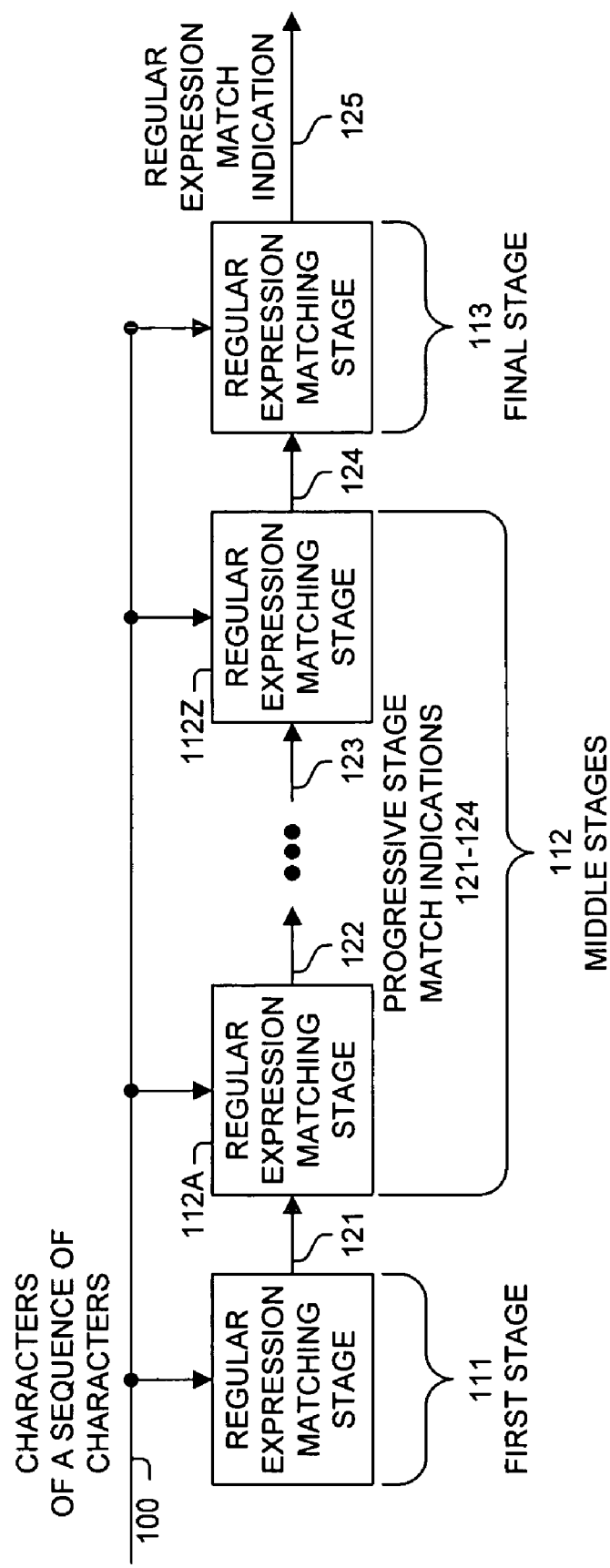
FIGS. 1, 2A and 2B are a block diagrams of exemplary regular expression matching mechanisms with multiple regular expression matching stages connected in a pipeline manner that can be used in one embodiment.

Disclosed are, inter alia, methods, apparatus, data structures, computer-readable media, and mechanisms, for regular expression matching of a sequence of characters using a pipeline architecture of regular expression matching stages, which may be particularly useful in certain in computer and communications systems, such as for, but not limited to, the processing of packets.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to, all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type. The term "character" is used to denote a value, such as, but not limited to, that represented by one byte, more than one byte, or less than one byte.

The term "storage mechanism" includes any type of memory, storage device or other mechanism for maintaining instructions or data in any format. "Computer-readable medium" is an extensible term including any memory, storage device, storage mechanism, and other storage mechanisms. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular form of a noun is non-limiting, with its use typically including one or more of the particular thing rather than just one (e.g., the use of the word "memory" typically refers to one or more memories without having to specify "memory or memories," or "one or more memories" or "at least one memory," etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, and mechanisms, for regular expression matching of a sequence of characters using a pipeline architecture of regular expression matching stages, which may be particularly useful in certain in computer and communications systems, such as for, but not limited to, the processing of packets. One embodiment includes multiple regular expression matching stages connected together in a pipeline manner. Each of these regular expression matching stages corresponds to a different portion of the regular expression. In one embodiment, a first stage receives and processes characters in order to identify whether or not its respective portion of the regular expression is matched, and provides such indication to its immediately subsequent stage. The other stages, in response to its immediately preceding stage indicating a match for its stage and all preceding stages for corresponding characters, signals the result of whether or not the current character results in a match of its stage to a next stage or to another device (e.g., the final stage may indicate to a packet processor whether or not the regular expression is matched). In one embodiment, multiple regular expression matching pipelines can be connected together in different configurations for processing different regular expressions.

One embodiment includes multiple regular expression matching stages connected together in a pipeline manner. Each of these regular expression matching stages corresponds to a different sequential portion of the regular expression, and receives and processes characters in the sequence of characters in order to identify whether or not a current character in the sequence of characters results in a match of its respective portion of the regular expression. The first stage is configured to indicate to a first middle stage of multiple middle stages in the pipeline of the regular expression matching stages when the first stage identifies that the current character results in a match of its respective portion of the regular expression. Each middle stage of is configured to indicate to a next stage in the pipeline of the regular expression matching stages when it identifies that a current character results in a match of its respective portion of the regular expression and all previous stages in the pipeline of the regular expression matching stages have identified that corresponding previous characters in the sequence of characters have resulted in matching corresponding portions of the regular expression. The final stage is configured to indicate when it matches a current character and all previous stages in the pipeline of the regular expression matching stages have identified that corresponding previous characters in the sequence of characters have resulted in matching corresponding portions of the regular expression so as to identify that the regular expression is matched by the sequence of characters.

In one embodiment, each of the sequential portions of the regular expression consists of a single character. In one embodiment, at least one particular regular expression matching stages of the regular expression matching stages is responsive to a counting mechanism such that a current character does not result in the match of its respective portion of the regular expression until the counting mechanism identifies that its respective portion has been matched a predetermined number of consecutive times greater than one.

One embodiment includes a packet processor for processing a packet including the sequence of characters based on the identification by the final stage of whether or not the regular expression is matched by the sequence of characters.

In one embodiment, the portion of the regular expression of at least one of the regular expression matching stages consists of matching a single character. In one embodiment, the respective portion of the regular expression of at least one of the regular expression matching stages includes the operation of identifying matching a specified character. In one embodiment, at least one of the regular expression matching stages is configured to identify whether or not a specified character in its the respective portion of the regular expression is matched by the current character as part of the identification of whether or not the current character in the sequence of characters results in the match of its the respective portion of the regular expression. In one embodiment, at least one of the regular expression matching stages is configured to identify whether or not a specified character in its the respective portion of the regular expression is matched by the current character in response to receiving the indication from its immediately preceding stage of the regular expression matching stages that it and all of its previous stages, if any, have the identified that corresponding previous characters in the sequence of characters have resulted in matching the respective portions of the regular expression.

In one embodiment, the respective portion of the regular expression of at least one of the regular expression matching stages includes the operation of identifying matching a specified character exactly zero or one times. In one embodiment, at least one of the regular expression matching stages is configured to identify whether or not a specified character in its the respective portion of the regular expression is matched exactly zero or one times by the current character as part of the identification of whether or not the current character in the sequence of characters results in the match of its the respective portion of the regular expression. In one embodiment, at least one of the regular expression matching stages is configured to identify whether or not a specified character is matched exactly zero or one times by successive characters in the sequence of characters in response to receiving the indication from its immediately preceding stage of the regular expression matching stages that it and all of its previous stages, if any, have the identified that corresponding previous characters in the sequence of characters have resulted in matching the respective portions of the regular expression.

In one embodiment, the respective portion of the regular expression of at least one of the regular expression matching stages includes the operation of identifying matching a specified character exactly one or more times by consecutive characters in the sequence of characters. In one embodiment, at least one of the regular expression matching stages is configured to identify whether or not a specified character is matched exactly one or more times by successive characters in the sequence of characters as part of the identification of whether or not the current character in the sequence of characters results in a match of its the respective portion of the regular expression. In one embodiment, at least one of the regular expression matching stages is configured to identify whether or not a specified character is matched exactly one or more times by successive characters in the sequence of characters in response to receiving the indication from its immediately preceding stage of the regular expression matching stages that it and all of its previous stages, if any, have the identified that corresponding previous characters in the sequence of characters have resulted in matching the respective portions of the regular expression.

In one embodiment, the respective portion of the regular expression of at least one of the regular expression matching stages includes the operation of identifying matching a specified character exactly zero or more times by consecutive characters in the sequence of characters. In one embodiment, at least one of the regular expression matching stages is configured to identify whether or not a specified character is matched exactly zero or more times by successive characters in the sequence of characters as part of the identification of whether or not the current character in the sequence of characters results in a match of its the respective portion of the regular expression. In one embodiment, at least one of the regular expression matching stages is configured to identify whether or not a specified character is matched exactly zero or more times by successive characters in the sequence of characters in response to receiving the indication from its immediately preceding stage of the regular expression matching stages that it and all of its previous stages, if any, have the identified that corresponding previous characters in the sequence of characters have resulted in matching the respective portions of the regular expression.

In one embodiment, the respective portion of the regular expression of at least one of the regular expression matching stages includes the operation of identifying not matching a specified character. In one embodiment, at least one of the regular expression matching stages is configured to identify whether or not a specified character is not matched by the current character as part of the identification of whether or not the current character in the sequence of characters results in a match of its the respective portion of the regular expression. In one embodiment, at least one of the regular expression matching stages is configured to identify whether or not a specified character is not matched by the current character in response to receiving the indication from its immediately preceding stage of the regular expression matching stages that it and all of its previous stages, if any, have the identified that corresponding previous characters in the sequence of characters have resulted in matching the respective portions of the regular expression.

In one embodiment, the respective portion of the regular expression of at least one of the regular expression matching stages includes the operation of identifying matching the upper or lower case of a specified character. In one embodiment, at least one of the regular expression matching stages is configured to identify whether or not the upper or lower case of a specified character in its the respective portion of the regular expression is matched by the current character as part of the identification of whether or not the current character in the sequence of characters results in the match of its the respective portion of the regular expression. In one embodiment, at least one of the regular expression matching stages is configured to identify whether or not the upper or lower case of a specified character in its the respective portion of the regular expression is matched exactly one time by the current character in response to receiving the indication from its immediately preceding stage of the regular expression matching stages that it and all of its previous stages, if any, have the identified that corresponding previous characters in the sequence of characters have resulted in matching the respective portions of the regular expression.

In one embodiment, the regular expression includes the operation of matching one of a set of two or more different characters. In one embodiment, at least one of the regular expression matching stages is configured to identify whether or not its regular expression matching stage results in a match of its the respective portion of the regular expression based on an OR operation of the matching result of its the respective portion of the regular expression with the current character and the matching result of one or more of its immediately preceding regular expression matching stages of their the respective portions of the regular expression with the current character. In one embodiment, at least one of the regular expression matching stages is configured to identify whether or not its regular expression matching stage results in a match of its the respective portion of the regular expression based on an OR operation of the matching result of its the respective portion of the regular expression with the current character and the matching result of one or more of its immediately preceding regular expression matching stages of their the respective portions of the regular expression with the current character in response to the earliest stage of the or more of its immediately preceding regular expression matching stages receiving the indication from its immediately preceding stage of the regular expression matching stages that it and all of its previous stages, if any, have the identified that corresponding previous characters in the sequence of characters have resulted in matching the respective portions of the regular expression.

One embodiment for identifying whether or not a sequence of characters matches one or more regular expressions includes a first regular expression matching pipeline including a plurality of first regular expression matching stages, with each of the first regular expression matching stages programmed to match corresponding portions of the regular expressions, with each of the first regular expression matching stages connected together in a pipeline manner. Each particular first matching stage of the first regular expression matching stages is responsive to the sequence of characters and its the programming, as well a match indication from its immediately preceding the regular expression matching stage in the first regular expression matching pipeline if it has an immediately preceding the regular expression matching stage in the first regular expression matching pipeline, in identifying whether or not to generate a match indication for indicating that the particular first matching stage and all of its preceding the regular expression matching stages in the first regular expression matching pipeline have identified a match for corresponding characters in the sequence of characters. A second regular expression matching pipeline includes a plurality of second regular expression matching stages, each of the second regular expression matching stages programmed to match corresponding portions of the regular expressions, with each of the second regular expression matching stages connected together in a pipeline manner. Each particular second matching stage of the second regular expression matching stages is responsive to the sequence of characters and its the programming, as well a match indication from its immediately preceding the regular expression matching stage in the second regular expression matching pipeline if it has an immediately preceding the regular expression matching stage in the second regular expression matching pipeline, in identifying whether or not to generate a match indication for indicating that the particular second matching stage and all of its preceding the regular expression matching stages in the second regular expression matching pipeline have identified a match for corresponding characters in the sequence of characters. A connection mechanism is responsive to programming values or signals identifying a selected one of the first regular expression matching stages, wherein the connection mechanism is configured to selectively connect the second regular expression matching pipeline to the selected one of the first regular expression matching stages such that the selected one of the first regular expression matching stages is further responsive to the second regular expression matching pipeline in identifying whether or not to generate its the match indication.

In one embodiment, the connection mechanism is configured to selectively not connect the second regular expression matching pipeline to any the first regular expression matching stages such that the first and second regular expression matching pipelines operate independently on two different regular expressions. In one embodiment, the selected one of the first regular expression matching stages is responsive to a mechanism for identifying whether or not the second regular expression pipeline identifies a predetermined number of times greater than one that all the second regular expression matching stages have identified as being matched for corresponding characters in the sequence of characters. In one embodiment, the selected one of the first regular expression matching stages will not identify to its immediately succeeding stage in the first regular expression matching stages until the mechanism identifies that all the second regular expression matching stages have identified as being matched for corresponding characters in the sequence of characters. One embodiment includes a packet processor for processing a packet including the sequence of characters based on the identification by the first regular expression matching pipeline of whether or not the regular expression is matched by the sequence of characters.

In one embodiment, in response to an immediately preceding stage to a particular stage in the pipeline of a regular expression matching stages identifying that it and all of its preceding the regular expression matching stages in the pipeline of the regular expression matching stages have identified a match of their respective portions of a regular expression for corresponding characters a sequence of characters and determining that a current character in the sequence of characters results in a match of a corresponding portion of the regular expression corresponding to the particular stage, the particular regular expression matching stage communicates to a next stage in the pipeline of regular expression matching stages or to another device that the portion of the regular expression corresponding to the plurality of regular expression matching stages is matched for the sequence of characters through the current character.

One embodiment includes a packet processor that is communicatively coupled to the regular expression pipeline, and receives an indication that the plurality of regular expression matching stages identified that the portion of the regular expression corresponding to the plurality of regular expression matching stages is matched for the sequence of characters through the current character; and in response to the indication, processing a packet including the sequence of characters based on the identification by the plurality of regular expression matching stages.

One embodiment for identifying whether or not a sequence of characters matches one or more regular expressions includes a first regular expression matching pipeline including a plurality of first regular expression matching stages. Each of the first regular expression matching stages are programmed to match corresponding portions of the regular expressions, with each of the first regular expression matching stages connected together in a pipeline manner. Each particular first matching stage of the first regular expression matching stages includes: means for receiving the sequence of characters and a match indication from its immediately preceding the regular expression matching stage in the first regular expression matching pipeline if it has an immediately preceding the regular expression matching stage in the first regular expression matching pipeline; and means for identifying whether or not to generate a match indication for indicating that the particular first matching stage and all of its preceding the regular expression matching stages in the first regular expression matching pipeline have identified a match for corresponding characters in the sequence of characters.

One embodiment includes a second regular expression matching pipeline including a plurality of second regular expression matching stages, each of the second regular expression matching stages programmed to match corresponding portions of the regular expressions, with each of the second regular expression matching stages connected together in a pipeline manner, wherein each particular second matching stage of the second regular expression matching stages includes: means for receiving the sequence of characters and a match indication from its immediately preceding the regular expression matching stage in the second regular expression matching pipeline if it has an immediately preceding the regular expression matching stage in the second regular expression matching pipeline; and means for identifying whether or not to generate a match indication for indicating that the particular second matching stage and all of its preceding the regular expression matching stages in the second regular expression matching pipeline have identified a match for corresponding characters in the sequence of characters; and means for connecting the second regular expression pipeline to the first regular expression pipeline; wherein the means for identifying whether or not to generate a match indication of at least one of the first regular expression matching stages is further responsive to the second regular expression matching pipeline.

One embodiment includes a packet processor for processing a packet including the sequence of characters based on the identification by the first regular expression matching pipeline of whether or not the regular expression is matched by the sequence of characters.

Turning to the figures, FIG. 1 is a block diagram of a regular expression matching mechanism with multiple regular expression matching stages (111, 112A-Z, 113) connected in a pipeline manner used in one embodiment. Each of the regular expression matching stages (111, 112A-Z, 113) receive characters in the sequence of characters for identifying whether their respective corresponding portions of the regular expression are matched. First regular expression matching stage 111 receives each character 100 and identifies (121) to regular expression matching stage 112A whether or not its portion of the regular expression was matched. If regular expression matching stage 112A receives an indication that the previous character (100) resulted in a match of first stage 111 and the current character (100) (e.g., the character after the previous character) results in a match of its portion of the regular expression, then it will provide an indication (122) of a match to the next stage, otherwise it will provide an indication (122) of no match to the next stage. This process proceeds for each received character for first stage 111, middle stages 112, and final stage 113 with indications 121-125 generated to indicate match or no-match conditions (and there may be multiple possible matches of the regular expression simultaneously propagating through the regular expression matching mechanism).

Note, first stage 111 does not receive an indication from a previous stage in the pipeline (as there is not one), and final stage 113 does not provide an indication to a next stage in the pipeline (as there is not one), but rather typically provides an indication 125 to another device indicating whether or not (or typically at least when) a match of the regular expression by the sequence of characters is identified. Note, there can be more stages in a pipeline than required to match a regular expression, with these currently unused stages typically configured to immediately propagate the match signal received from a prior stage. Note, in one embodiment, a stage receives each character in the sequence of characters. In one embodiment, a stage only receives a current character if the previous stage identified a match condition for the previous character. In one embodiment, a stage identifies for each received character whether or not its portion of the regular expression is matched; while in one embodiment, a stage identifies for a received character whether or not its portion of the regular expression is matched only when the previous stage identified a match condition for the previous character.

Figure 2A:
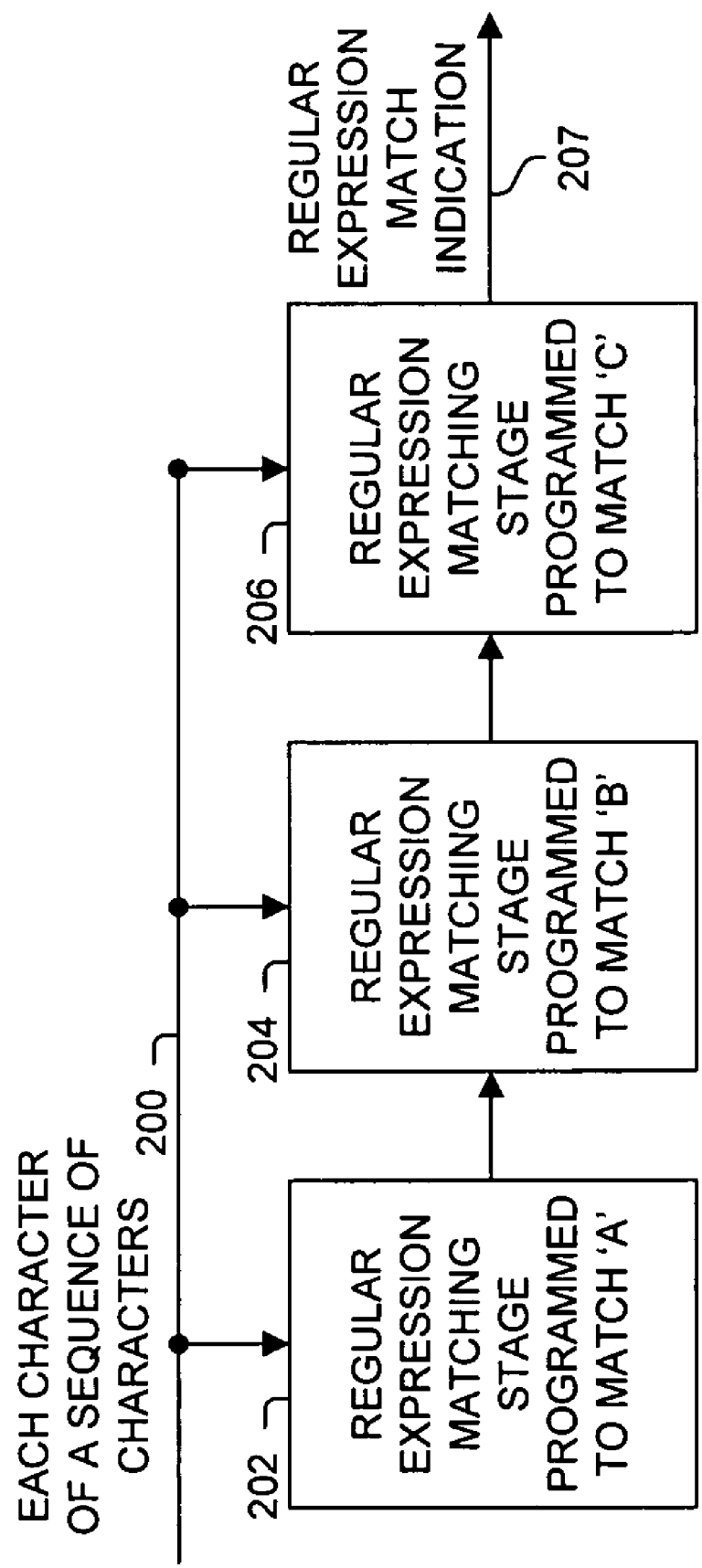
Figure 2B:
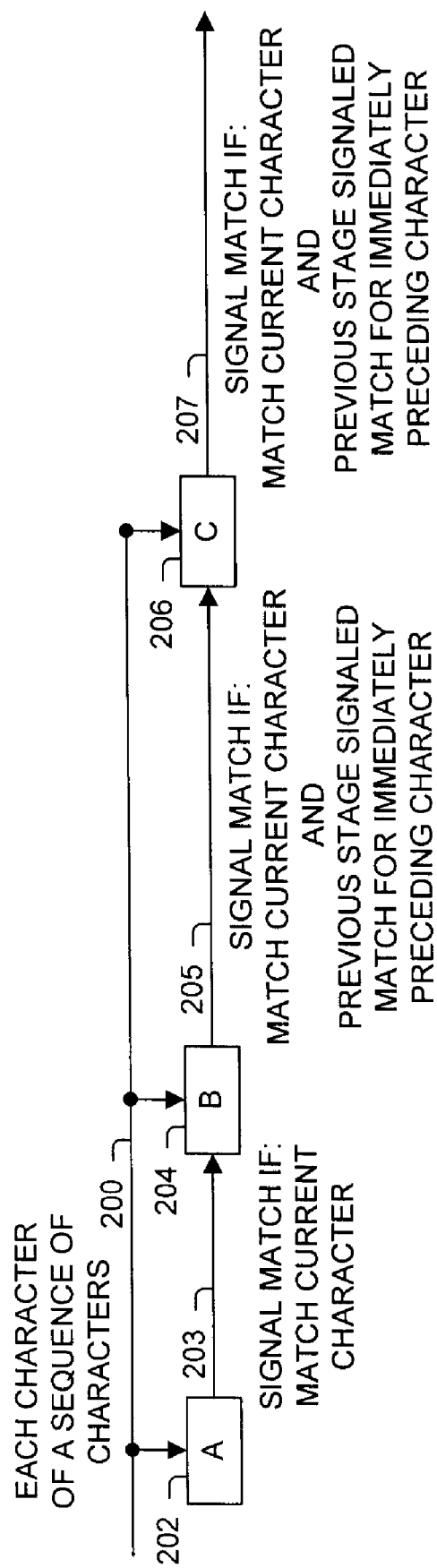

FIGS. 2A-2B provide an illustrative example of one embodiment matching the regular expression "ABC" (i.e., the character 'A' immediately followed by the character 'B' immediately followed by the character 'C'). This is a simple example, while other embodiments of a regular expression mechanism may support the evaluation of complex regular expressions as described herein. Shown in FIG. 2A are the first, second and third regular expression matching stages (202, 204, 206) programmed with their respective portions of the regular expression (i.e., 'A', 'B', and 'C'). Characters (200) of the sequence of characters are provided to each of the expression matching stages (202, 204, 206) for determining whether or not the regular expression has been matched as indicated by regular expression match indication 207.

Illustrated in FIG. 2B are the signals generated between stages in one embodiment. Regular expression matching stage 202 will provide and a match/no-match indication (203) to regular expression matching stage 204 for each character, with a match indication provided if the current character is an 'A', else a no-match indication. Regular expression matching stage 204 will provide and a match/no-match indication (205) to regular expression matching stage 206 for each character (e.g., the time slot for the character), with a match indication provided if signal 203 indicated a match for the previous character and the current character is an 'B', else a no-match indication. Regular expression matching stage 206 will provide and a match/no-match indication (207) for each character, with a match indication provided if signal 205 indicated a match for the previous character and the current character is an 'C', else a no-match indication. Thus, the determination of whether or not a regular expression has been matched by a sequence of characters propagates through the pipeline of regular expression matching stages, and a match indication is provided when each stage has identified a match for corresponding characters in the sequence of characters. For example, an indication of a match 207 will be provided for each occurrence of the sequence of the three characters "ABC" in the sequence of characters 200. In other words, in one embodiment, a match of the regular expression will be identified by a matching mechanism when each stage of the pipeline of regular expression matching stages identifies a match condition for its respective portion of the regular expression for corresponding characters in the sequence of characters.

Figure 2C:
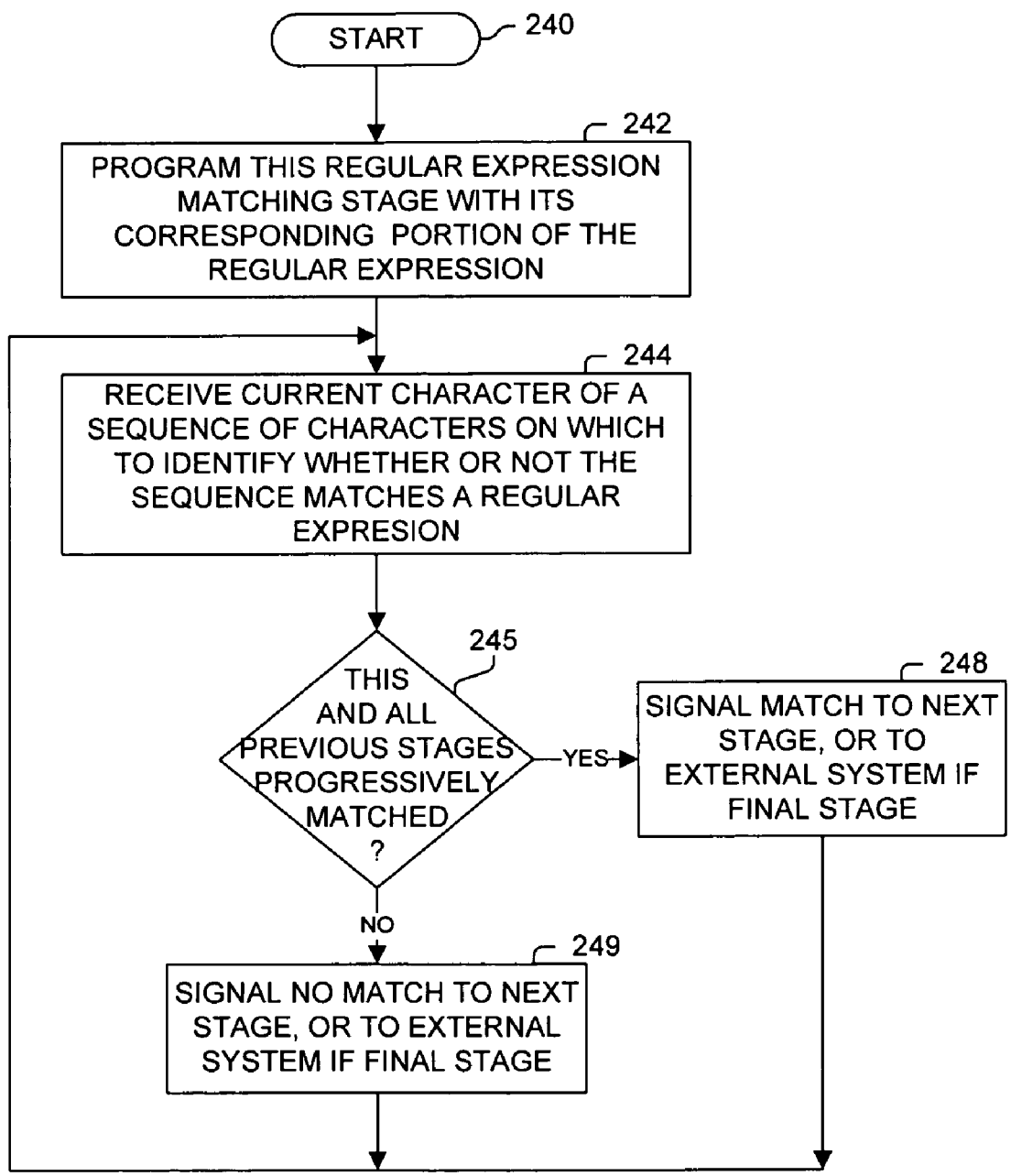
FIG. 2C is flow diagram illustrating operations performed in one embodiment for identifying whether or not a stage signals a match or no-match condition.

FIG. 2C is flow diagram illustrating operations performed in one embodiment for identifying whether or not a regular expression matching stage signals a match or no-match condition. Processing begins with process block 240, and proceeds to process block 242, wherein the regular expression matching stage is programmed with its corresponding portion of the regular expression. In process block 244, a current character of the sequence of characters is received. As determined in process block 245, if this stage and all previous stages identified a match condition for their respective portions of the regular expression for corresponding characters in the sequence of characters, then in process block 248, a match indication is provided to the next stage (or an external device); else a no-match indication is provided in process block 249. Processing then returns to process block 244 to process the next character.

FIGS. 3A-3G illustrate the extensible nature of regular expression matching stages used in one embodiment for evaluating their portion of a regular expression. Note, if a stage does not have a previous stage, then those operations are not performed for that stage. These processes are exemplary, as different embodiment may implement these operations differently or in a different order. For example, in one embodiment, a stage receives each character in the sequence of characters. In one embodiment, a stage only receives a current character if the previous stage identified a match condition for the previous character. In one embodiment, a stage identifies for each received character whether or not its portion of the regular expression is matched; while in one embodiment, a stage identifies for a received character whether or not its portion of the regular expression is matched only when the previous stage identified a match condition for the previous character.

Figure 3A:
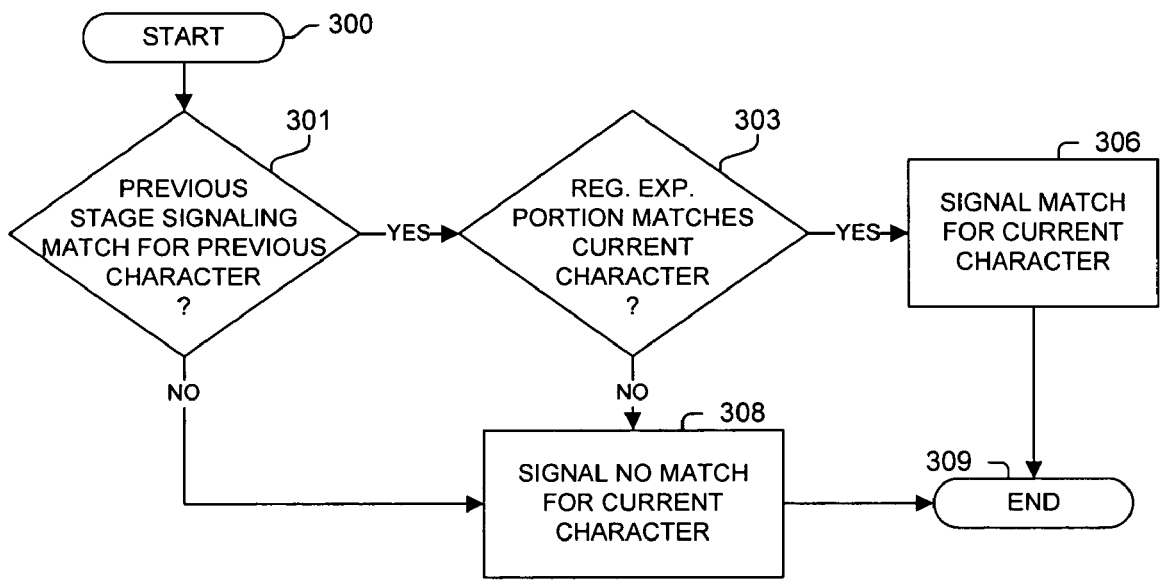
FIGS. 3A-G are flow diagrams illustrating various operations performed in one embodiment for identifying whether or not a stage signals a match or no-match condition.

FIG. 3A is a flow diagram illustrating operations performed in one embodiment for identifying whether or not a regular expression matching stage identifies a match or no-match condition for its portion of the regular expression of matching a specified single character. Processing begins with process block 300. As determined in process block 301, if its immediately preceding stage identified a no-match condition for the previous character, then in process block 308, a no-match condition is identified for the current character. Otherwise, as determined in process block 303, if its regular expression portion (i.e., the specified single character) matches the current character, then a match indication is identified for the current character in process block 306; otherwise, a no-match condition is identified for the current character in process block 308. Processing of this character is complete as indicated by process block 309.

Figure 3B:
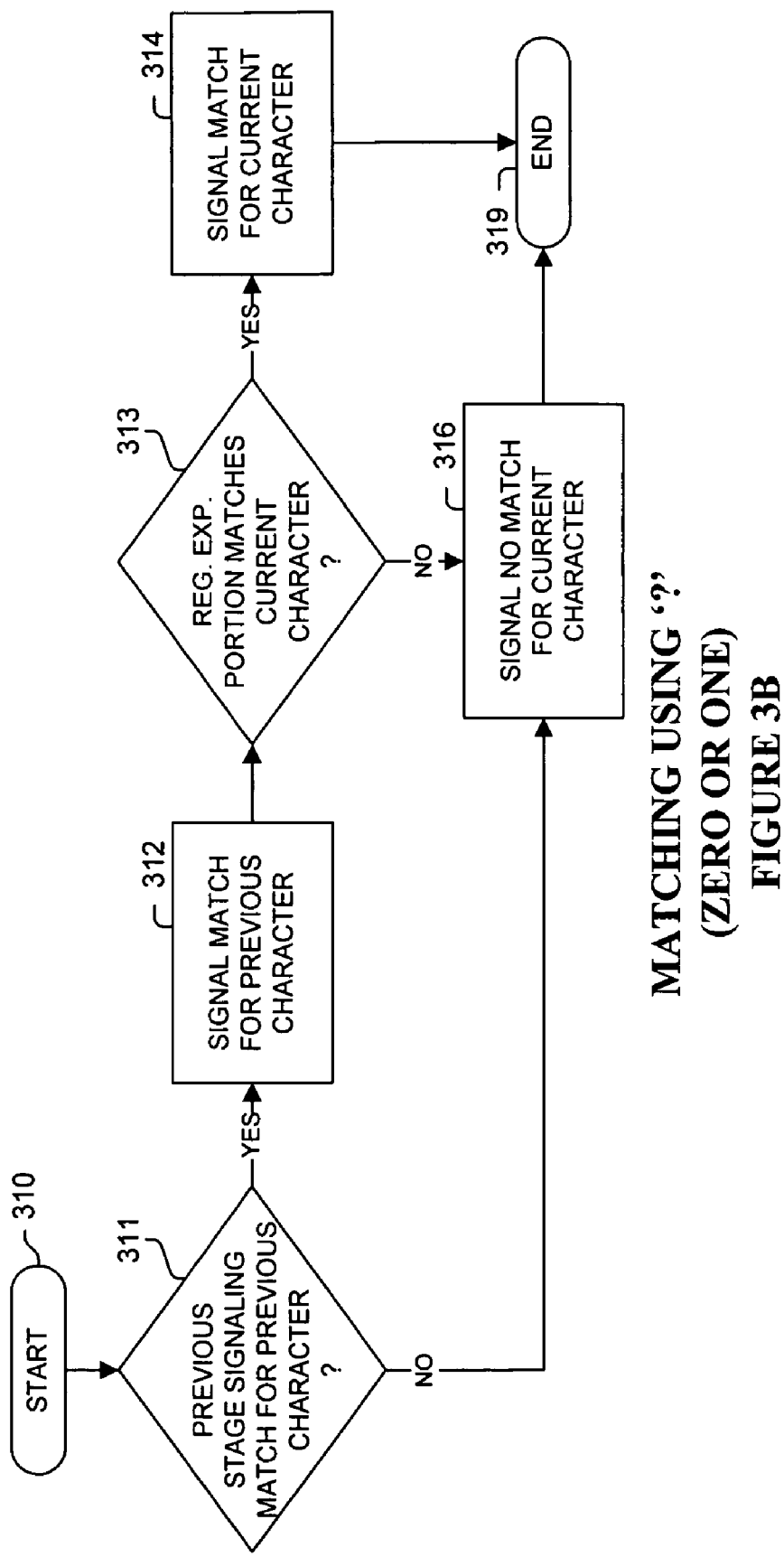

FIG. 3B is a flow diagram illustrating operations performed in one embodiment for identifying whether or not a regular expression matching stage identifies a match or no-match condition for its portion of the regular expression of matching a specified character zero or one times (typically denoted in a regular expression with the character '?'). Processing begins with process block 310. As determined in process block 311, if its immediately preceding stage identified a no-match condition for the previous character, then in process block 316, a no-match condition is identified for the current character. Otherwise, a match indication is immediately identified for the previous character in process block 312 (whether or not it was previously determined to be a match condition). Note, in one embodiment, the regular expression matching stages are timed to provide the propagation time through the successive stages for possible changes to the matching condition result for the previous character. As, as determined in process block 313, if its regular expression portion (i.e., the specified character) matches the current character, then a match indication is identified for the current character in process block 314. Otherwise, a no-match condition is identified for the current character in process block 316. Processing of this character is complete as indicated by process block 319.

Figure 3C:
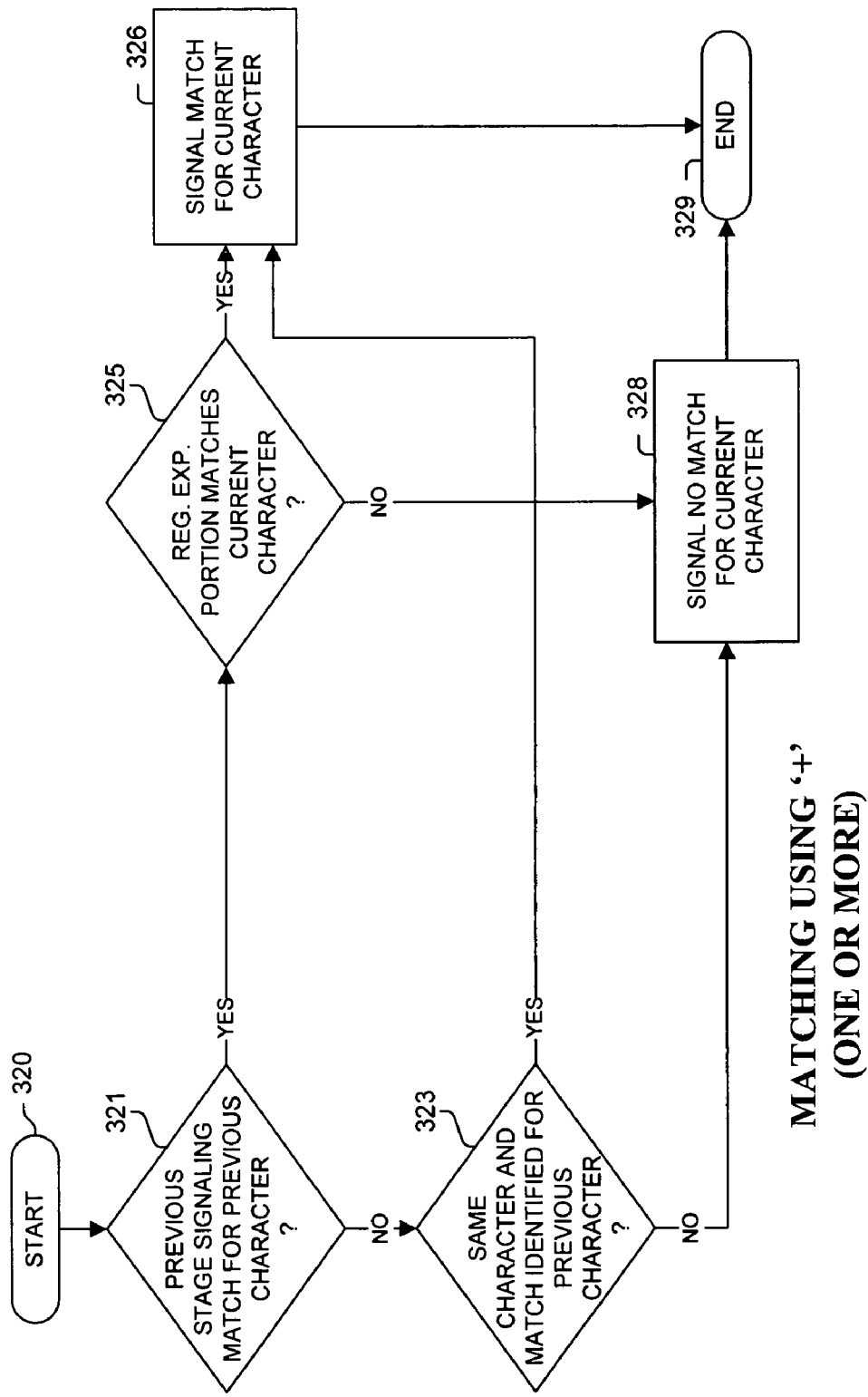

FIG. 3C is a flow diagram illustrating operations performed in one embodiment for identifying whether or not a regular expression matching stage identifies a match or no-match condition for its portion of the regular expression of matching a specified single character exactly one or more times (typically denoted in a regular expression with the character '+'). Processing begins with process block 320. As determined in process block 321, if its immediately preceding stage identified a no-match condition for the previous character, then as determined in process block 323, if the current character is the same as the previous character and a match was identified by this stage for the previous character (e.g., a sequence of two or more of the same character matching its portion of the regular expression), then a match indication is identified for the current character in process block 326; otherwise, a no-match condition is identified for the current character in process block 328. Otherwise, as determined in process block 325, if its regular expression portion (i.e., the specified single character, including a sequence of one or more of the same matching character) matches the current character, then a match indication is identified for the current character in process block 326; otherwise, a no-match condition is identified for the current character in process block 328. Processing of this character is complete as indicated by process block 329.

Figure 3D:
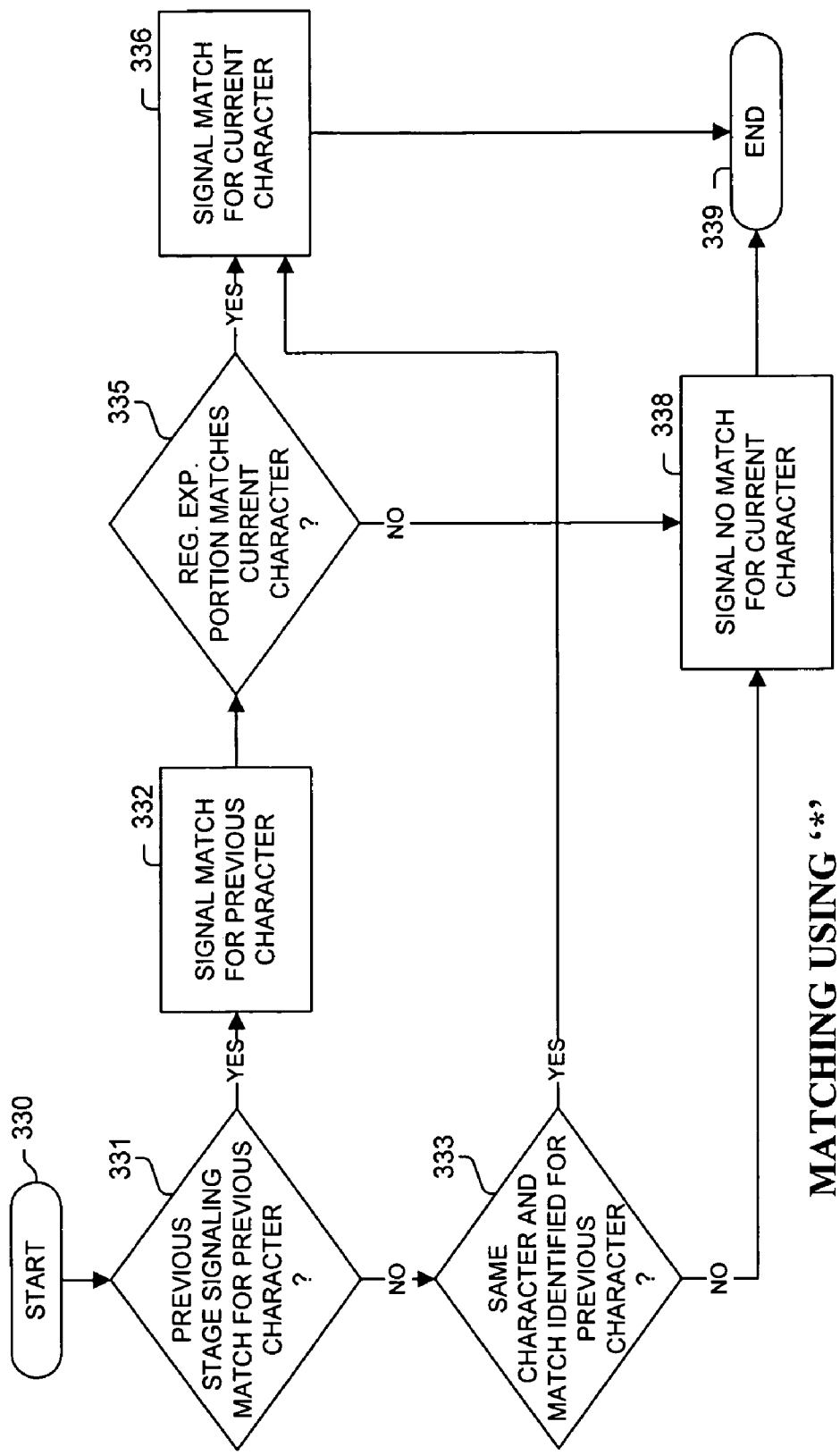

FIG. 3D is a flow diagram illustrating operations performed in one embodiment for identifying whether or not a regular expression matching stage identifies a match or no-match condition for its portion of the regular expression of matching a specified character zero or more times (typically denoted in a regular expression with the character '*'). Processing begins with process block 330. As determined in process block 331, if its immediately preceding stage identified a match condition for the previous character, a match indication is immediately identified for the previous character in process block 332 (whether or not it was previously determined to be a match condition). Note, in one embodiment, the regular expression matching stages are timed to provide the propagation time through the successive stages for possible changes to the matching condition result for the previous character. As, as determined in process block 335, if its regular expression portion (i.e., the specified character, including a sequence of zero or more of the same matching character) matches the current character, then a match indication is identified for the current character in process block 336; otherwise, a no-match condition is identified for the current character in process block 338. Otherwise processing proceeds to process block 333. As determined in process block 333, if the current character is the same as the previous character and a match was identified by this stage for the previous character (e.g., a sequence of two or more of the same character matching its portion of the regular expression), then a match indication is identified for the current character in process block 336; otherwise, a no-match condition is identified for the current character in process block 338. Processing of this character is complete as indicated by process block 339.

Figure 3E:
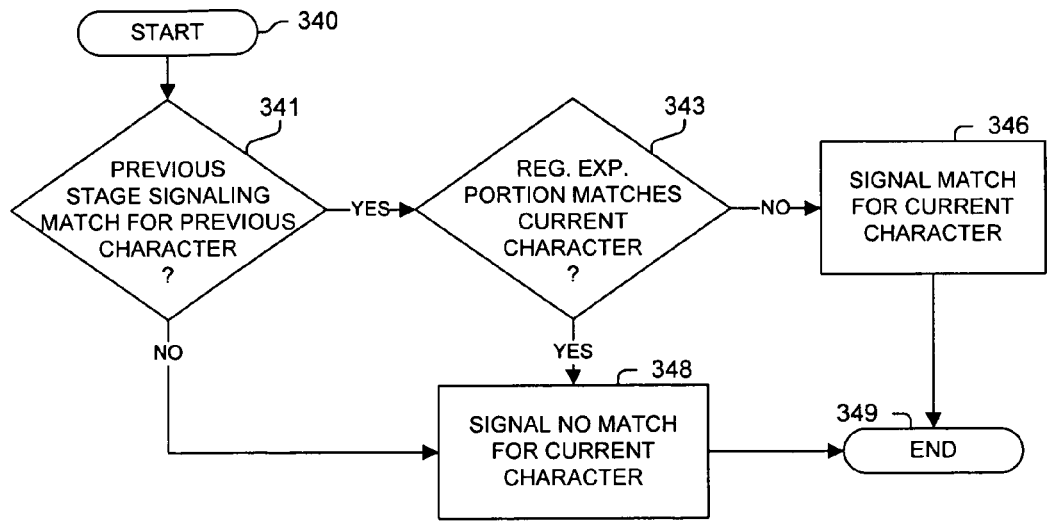

FIG. 3E is a flow diagram illustrating operations performed in one embodiment for identifying whether or not a regular expression matching stage identifies a match or no-match condition for its portion of the regular expression of not matching a specified single character (typically denoted in a regular expression with the character '!' followed by the specified character not to be matched). Processing begins with process block 340. As determined in process block 341, if its immediately preceding stage identified a no-match condition for the previous character, then in process block 348, a no-match condition is identified for the current character. Otherwise, as determined in process block 343, if its regular expression portion (i.e., the specified single character) matches the current character, then a no-match indication is identified for the current character in process block 348; otherwise, a match condition is identified for the current character in process block 346. Processing of this character is complete as indicated by process block 349.

Figure 3F:
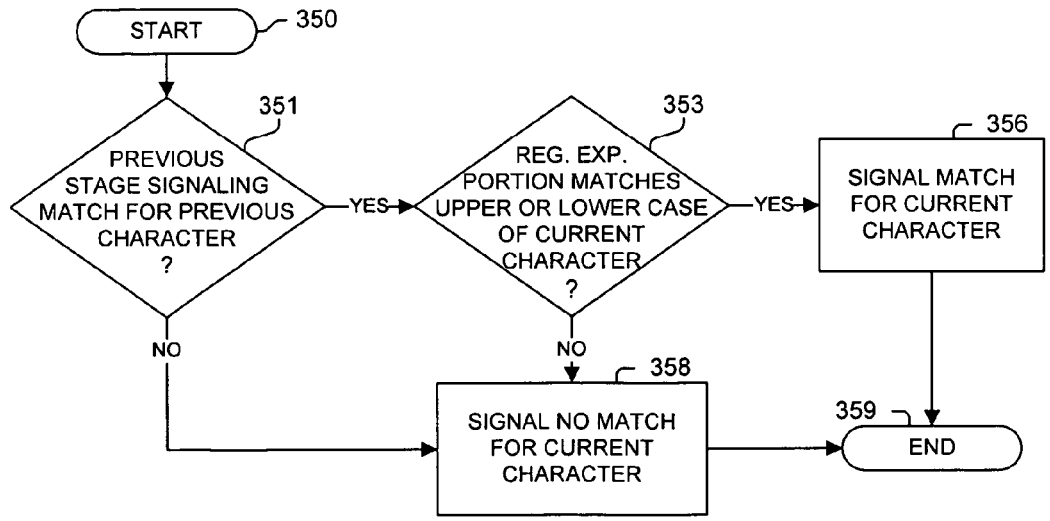

FIG. 3F is a flow diagram illustrating operations performed in one embodiment for identifying whether or not a regular expression matching stage identifies a match or no-match condition for its portion of the regular expression of matching the upper or lower case of a specified single character. Processing begins with process block 350. As determined in process block 351, if its immediately preceding stage identified a no-match condition for the previous character, then in process block 358, a no-match condition is identified for the current character. Otherwise, as determined in process block 353, if its regular expression portion (i.e., the upper or lower case of the specified single character) matches the current character, then a match indication is identified for the current character in process block 356; otherwise, a no-match condition is identified for the current character in process block 358. Processing of this character is complete as indicated by process block 359.

Figure 3G:
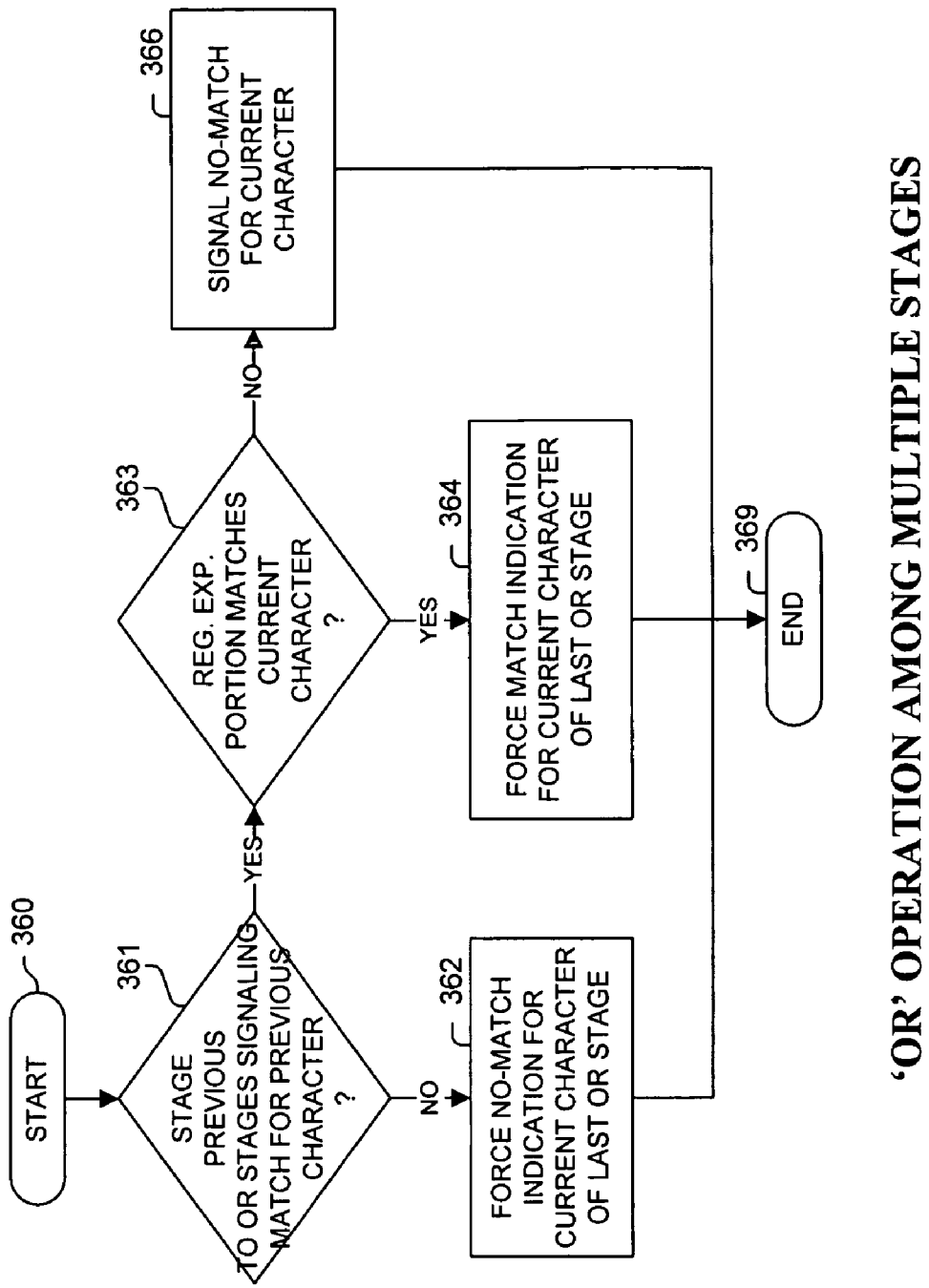

FIG. 3G is a flow diagram illustrating operations performed in one embodiment for identifying whether or not a regular expression matches a set of matching stages configured as an OR operation of one of their respective portions of the regular expression. Processing begins with process block 360. As determined in process block 361, if the immediately preceding stage to the set of matching stages identifies a no-match condition for the previous character, then as indicated in process block 362, a no-match condition will be generated by the last stage of the set of matching stages configured as an OR operation. Otherwise, as determined in process block 363, if its regular expression portion (i.e., the specified single character) matches the current character, then a match condition will be generated by the last stage of the set of matching stages configured as an OR operation as indicated by process block 364. Otherwise, a no-match condition is identified for the current character for this particular regular expression matching stage as indicated by process block 366. Processing of this character is complete as indicated by process block 369.

Figure 4A:
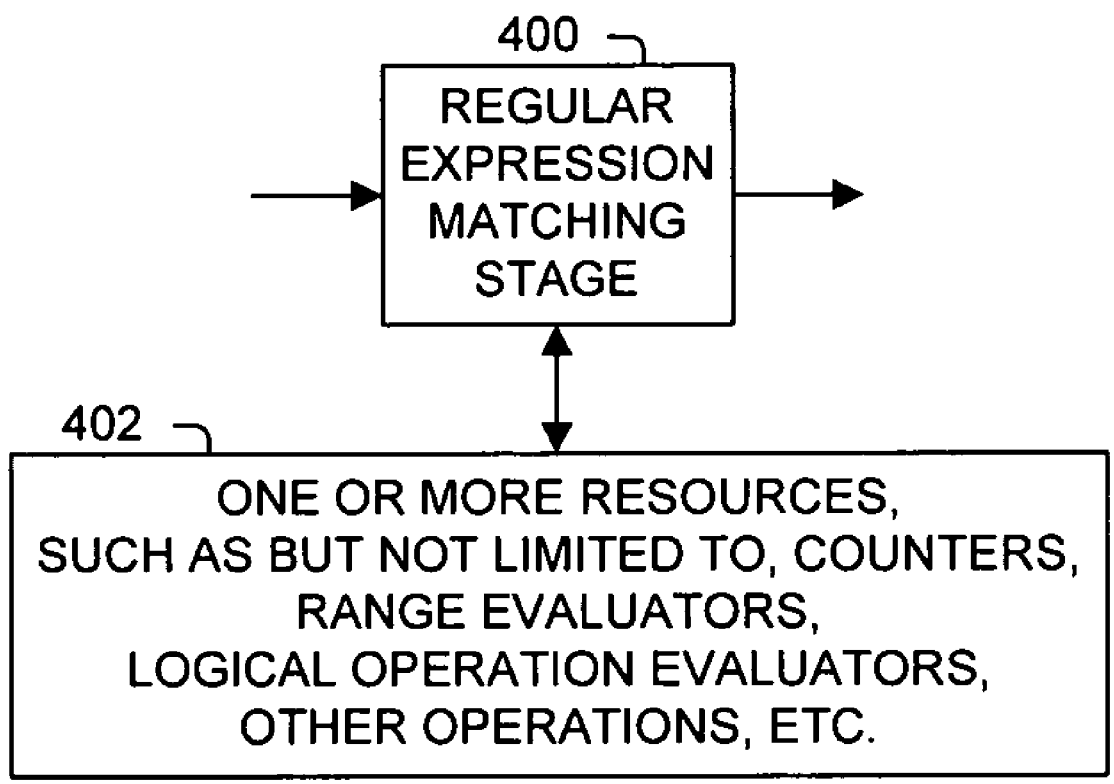
FIGS. 4A-B are block diagrams of illustrating the ability of regular expression matching stages to use resources in one embodiment.

FIG. 4A is a block diagram illustrating the use of resources by regular expression matching stages in one embodiment. In one embodiment, a regular expression matching stage 400 can make use of one or more resources 402, such as, but not limited to, counting mechanisms (e.g., match four times, match between three and seven times), range evaluators (match a value between seventy and ninety), multiple character matching (match 1, 3, 8, 9, 200, or 231), local operations (e.g., OR, AND), and/or other manipulation mechanisms for help in identifying whether or not a portion of the regular expression is matched. These resources may be internal to a stage or available for use by one or more stages. For example, in one embodiment, a connection mechanism is provided to connect resources to stages as needed for the particular regular expression being matched against. In this manner, resources can be shared among stages as required.

Figure 4B:
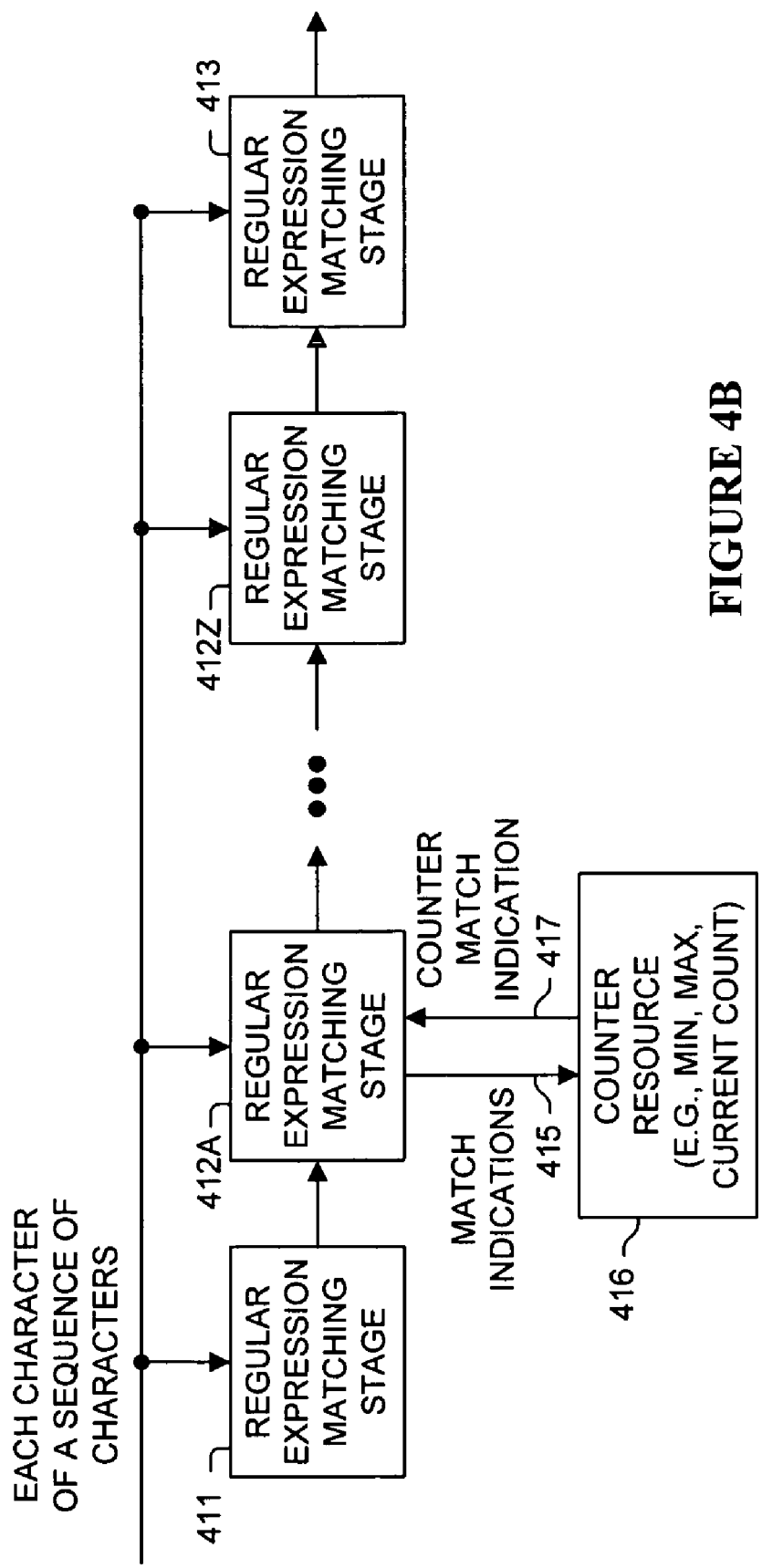

For example, FIG. 4B illustrates one such use of a counting resource. Shown are multiple regular expression matching stages (411, 412A-Z, 413) with stage 412A communicatively coupled to, and responsive to, counting mechanism resource 416. Based on matched indications 415, counting mechanism 416 can determine whether or not the programmed number of required matches has been satisfied, which such an indication 417 provided to regular expression matching stage 412A for use in determining whether the current character results in a match of its corresponding portion of the regular expression.

Figure 4C:
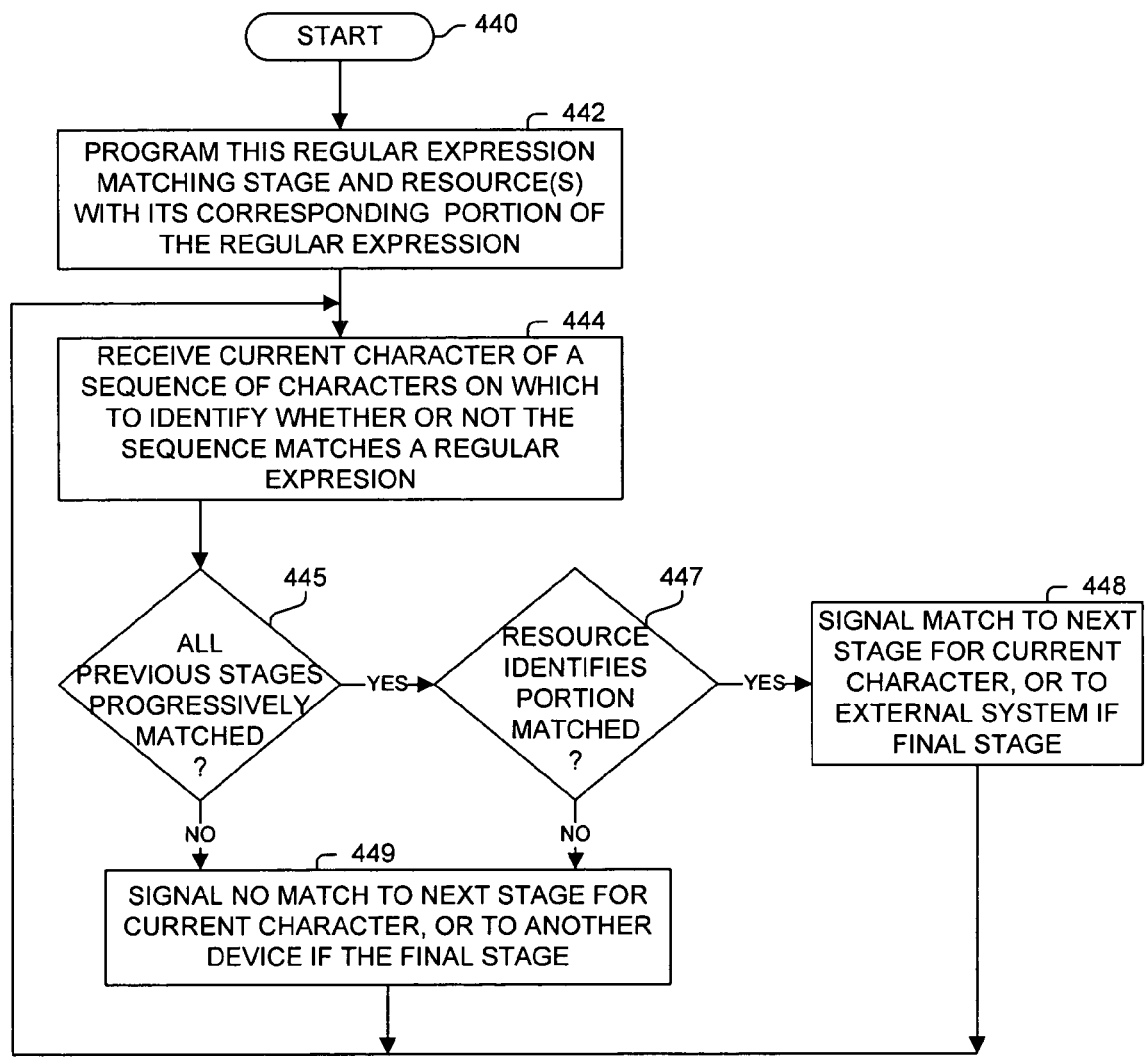
FIG. 4C is flow diagram illustrating operations performed in one embodiment for identifying whether or not a stage signals a match or no-match condition.

FIG. 4C is flow diagram illustrating operations performed in one embodiment for identifying whether or not a regular expression matching stage signals a match or no-match condition. Processing begins with process block 440, and proceeds to process block 442, wherein the regular expression matching stage and its resource(s) are programmed to reflect its corresponding portion of the regular expression. In process block 444, a current character is received. As determined in process blocks 445 and 447, if all previous stages have been progressively matched for corresponding characters of the sequence of characters and the resource indicates a match condition based on the current character, then in process block 448, a match condition for the current character is signaled to the next stage (or typically to a device if it is the final stage); otherwise, a no-match condition is accordingly signaled. Processing returns to process block 444 to process the next character in the sequence of characters.

Figure 5:
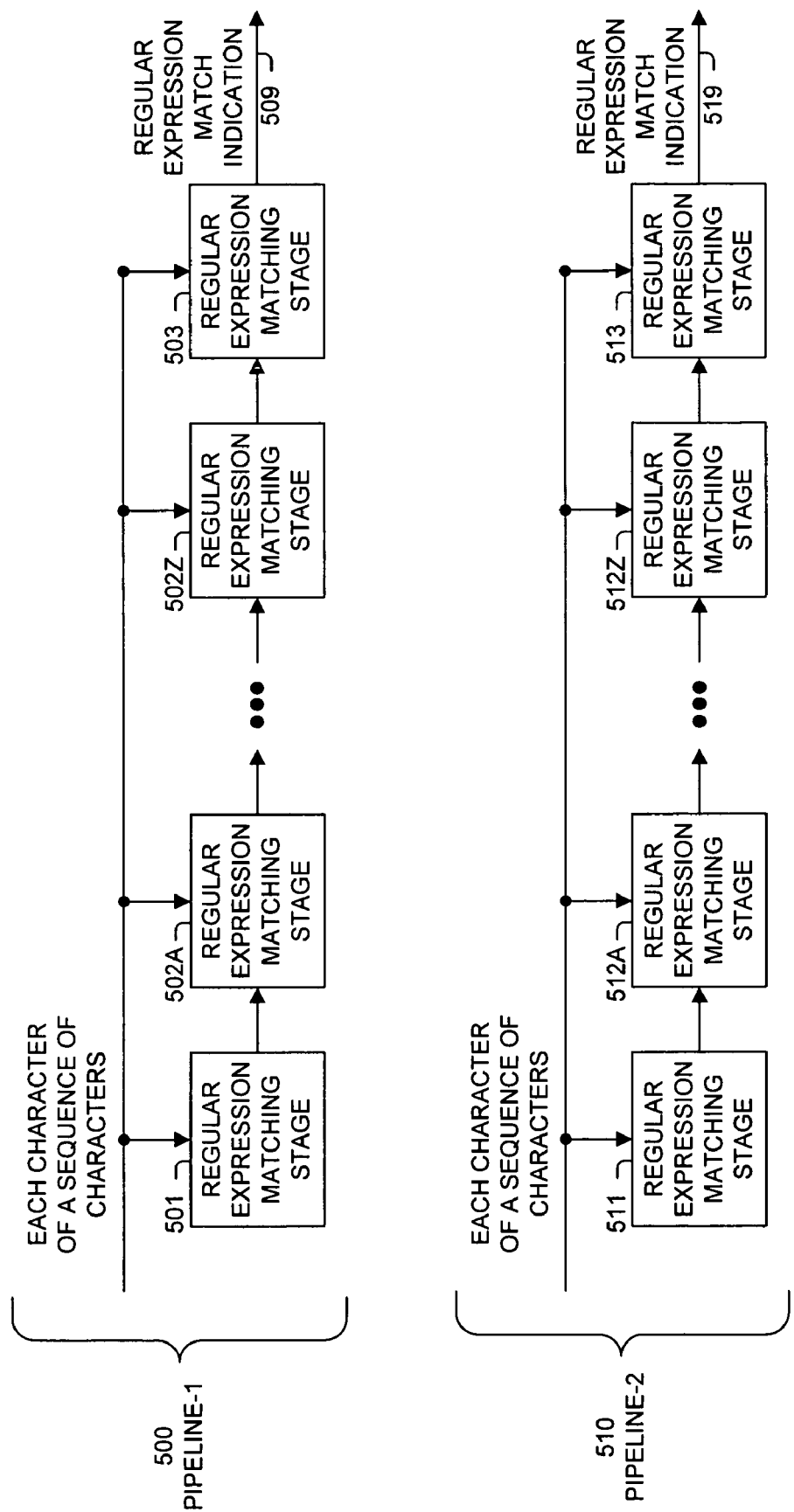

FIG. 5 is a block diagram of a regular expression matching mechanism with multiple regular expression matching stages connected in a pipeline manner used in one embodiment. As shown, a regular expression matching mechanism may include multiple pipelines 500 and 510 of multiple regular expression matching stages 501-503 and 511-513, respectively. These regular expression matching stages may work independent on a same or different sequence of characters for determining whether or not multiple regular expressions have been matched. Also, as a few of an extensible number of configurations are illustrated in FIGS. 6A-6C of how pipelines can be combined to identify whether a single regular expression has been matched.

Figure 6A:
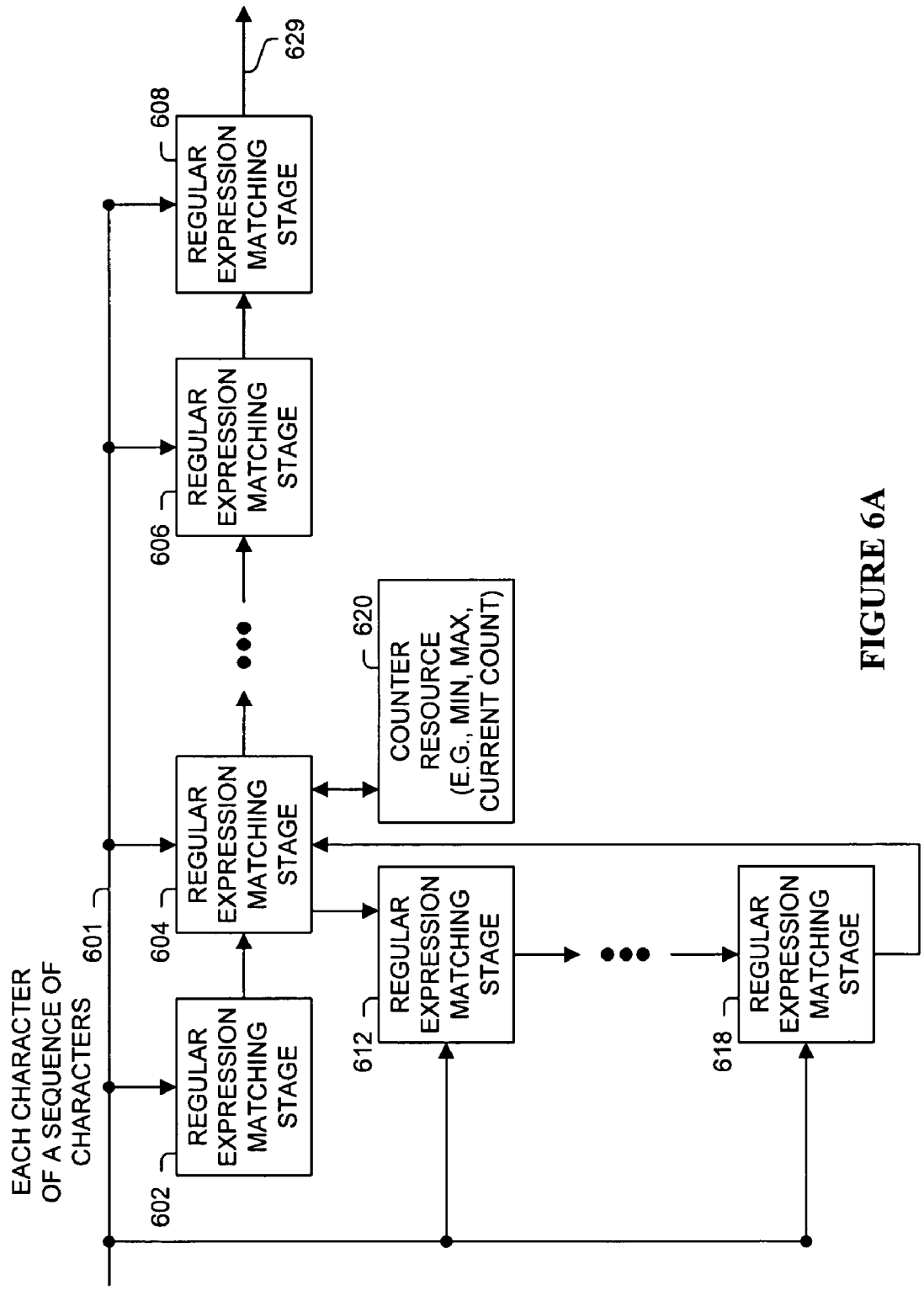

FIG. 6A is a block diagram of a regular expression matching mechanism with multiple regular expression matching stages connected in a pipeline manner used in one embodiment. As shown, a first pipeline includes regular expression matching stages 602-608. Shown for illustrative purposes of the extensible nature of embodiments of the invention are a second pipeline (which includes regular expression matching stages 612-618) and a counting mechanism resource 620 communicatively coupled to regular expression matching stage 604 (of course, this particular regular expression matching stage was chosen at random to use to illustrate one embodiment). This configuration is useful for determining whether or not a regular expression including a group of characters which must be matched a predetermined number of times. For example, assume the regular expression is AB(XY)(4,9)CD. For the configuration illustrated in FIG. 6A, regular expression matching stages 602, 604, 606, and 608 can respectively be programmed to match the characters 'A', 'B', 'C', 'D'; regular expression matching stages 612 and 618 can respectively be programmed to match the characters 'X', 'Y'; and counting mechanism can be programmed with the values of four and nine. Thus, when a character sequence of "AB" followed by "XY" repeated between 4 and 9 times followed by "CD" occurs in the sequence of characters 601, indication 629 will identify a match of this regular expression.

Figure 6B:
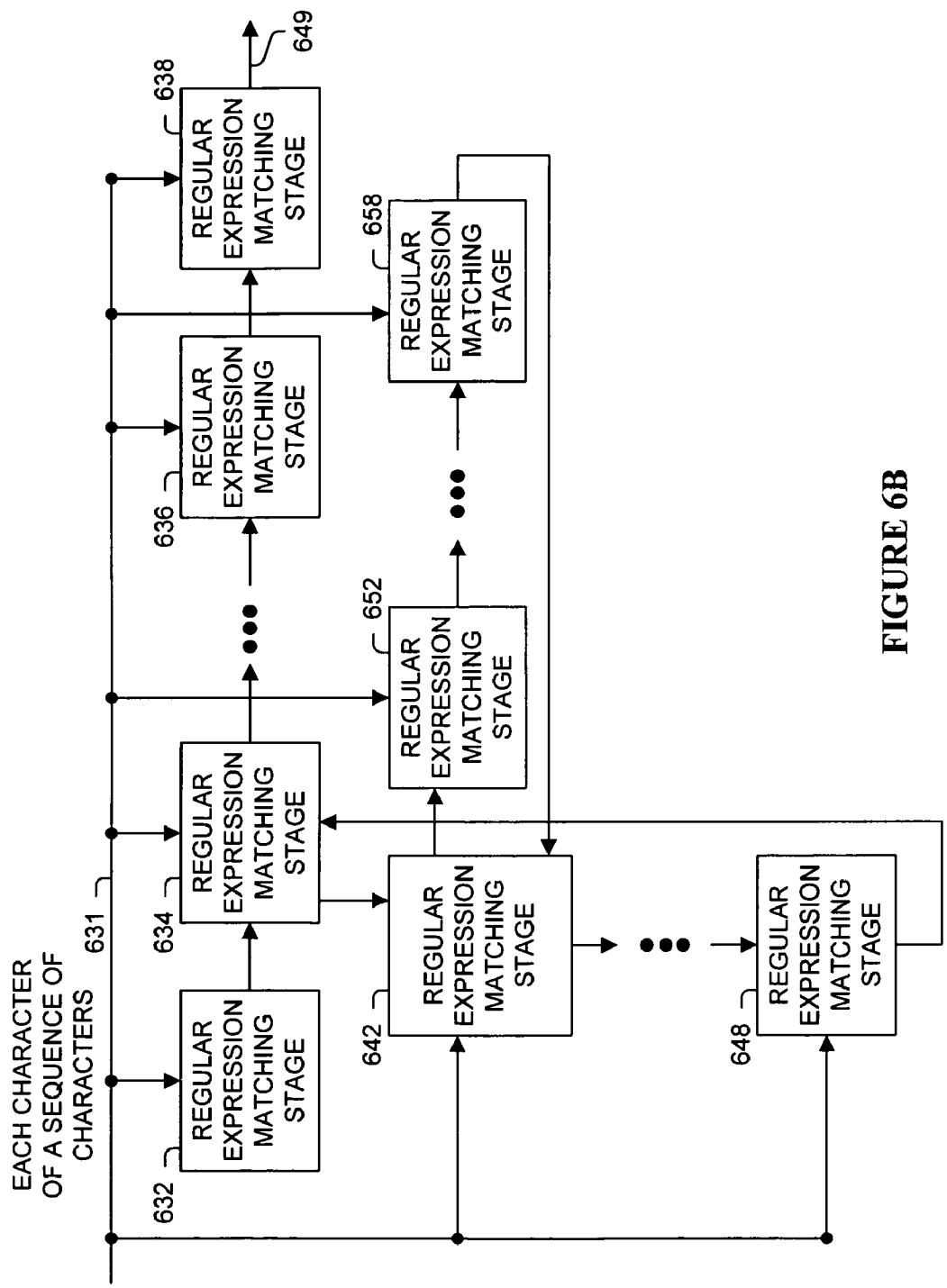

FIG. 6B is a block diagram of a regular expression matching mechanism with multiple regular expression matching stages connected in a pipeline manner used in one embodiment. FIG. 6B illustrates the extensible nature of embodiments which may be used to match regular expressions. Shown is an illustrative embodiment which uses three-dimensions of regular expression matching pipelines (i.e., those of regular expression matching stages 632-638, 642-648, and 652-658). When the sequence of characters 631 matches the programmed regular expression, indication 649 will identify a match of this regular expression.

FIG. 6C is a block diagram of a regular expression matching mechanism with multiple regular expression matching stages connected in a pipeline manner used in one embodiment. Shown is an illustrative embodiment which uses three regular expression matching pipelines (i.e., those of regular expression matching stages 662-666, 672-678, and 682-688). When the sequence of characters 661 matches the programmed regular expression, indication 666 will identify a match of this regular expression.

FIG. 6C is also used to illustrate that it is possible to provide inverse support using pipelines of regular expression matching stages. For example, a regular expression "A!BC" can be re-written as the AND operation of the two regular expressions of "!(ABC)" and "A(.*)C".

A more complex example would be assume a regular expression includes the sub-regular expression of "AB!(X-YZ)C" which can be evaluated by the configuration illustrated in FIG. 6C. Regular expression matching stages 672-678 can respectively be programmed to match the expression "ABXYZC"; and regular expression matching stages 682-688 can respectively be programmed to match the expression "AB(.*)C", with stage 664 (or a resource) providing the logical AND operation of these two expressions.

Figure 6D:
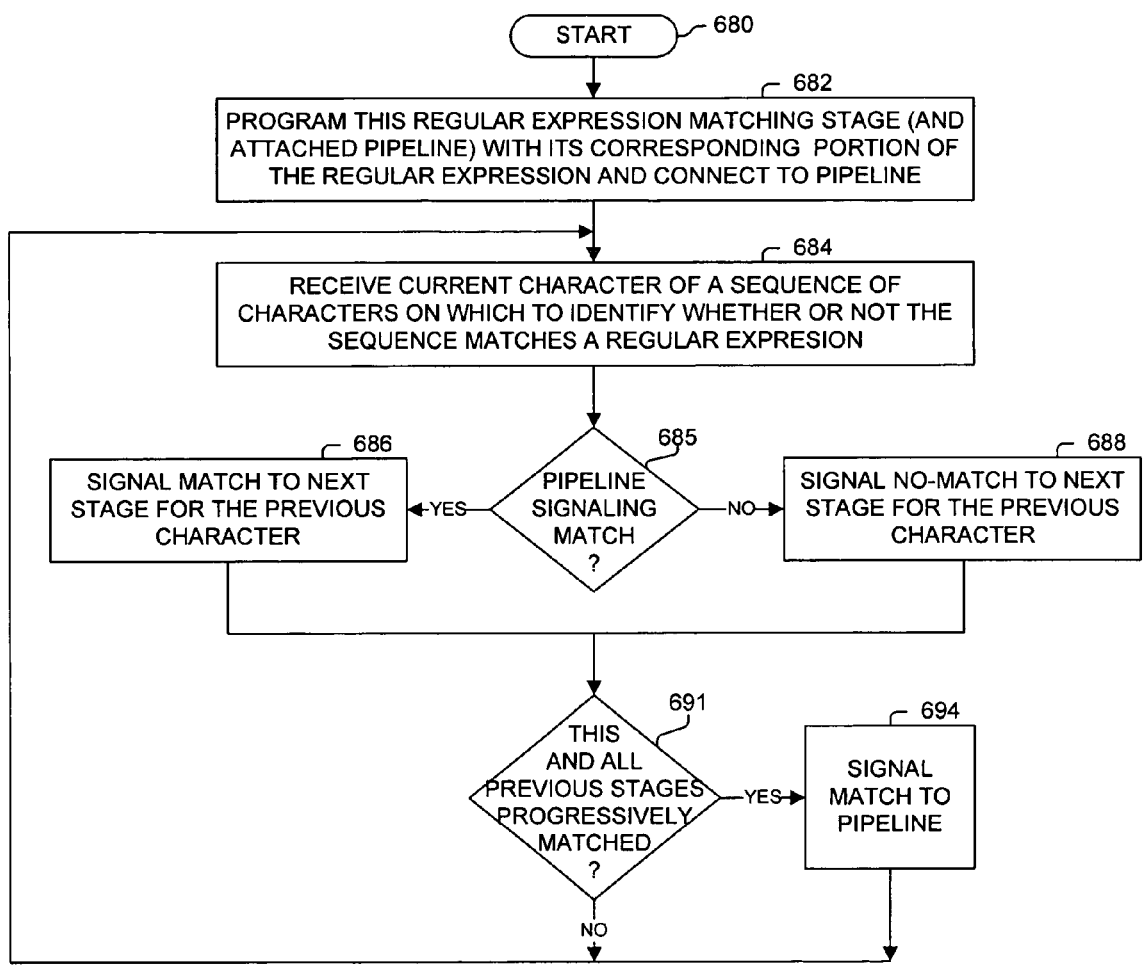
FIG. 6D is flow diagram illustrating operations performed in one embodiment for identifying whether or not a regular expression matching stage signals a match or no-match condition for a stage with an attached regular expression matching pipeline.

FIG. 6D is flow diagram illustrating operations performed in one embodiment for identifying whether or not a regular expression matching stage signals a match or no-match condition for a stage with an attached regular expression matching pipeline. Processing beings with process block 680, and proceeds to process block 682, wherein this stage (as well as the other stages) are programmed with their corresponding portion of the regular expression, and the pipeline is communicatively coupled to the stage, if required. Note, there are two portions to this process: receiving an indication from the pipeline of a match condition and forwarding to a next stage; and trigger the pipeline for processing. In process block 684, the current character of the sequence of characters is received.

For determining when to signal to a next stage that the pipeline has identified a match condition: as determined in process block 685, if the final stage of the pipeline is indicating a match condition for the previous character, a match indication to the next stage is immediately signaled for the previous character in process block 686; otherwise a no-match indication is accordingly signaled in process block 688. Note, in one embodiment, the determination made in process block 685 also depends on a resource. For example, a counting mechanism might require the pipeline to signal a match condition a predetermined number of times (or range of times) for the corresponding portion of the regular expression to be matched.

For determining when to trigger the pipeline: as determined in process block 691, if this regular expression matching stage and all previous stages have been matched for a sequence of characters concluding in the current character, then in process block 694, the pipeline is signaled with the match condition.

Processing returns to process block 684 to process the next character in the sequence of characters.

Figure 7:
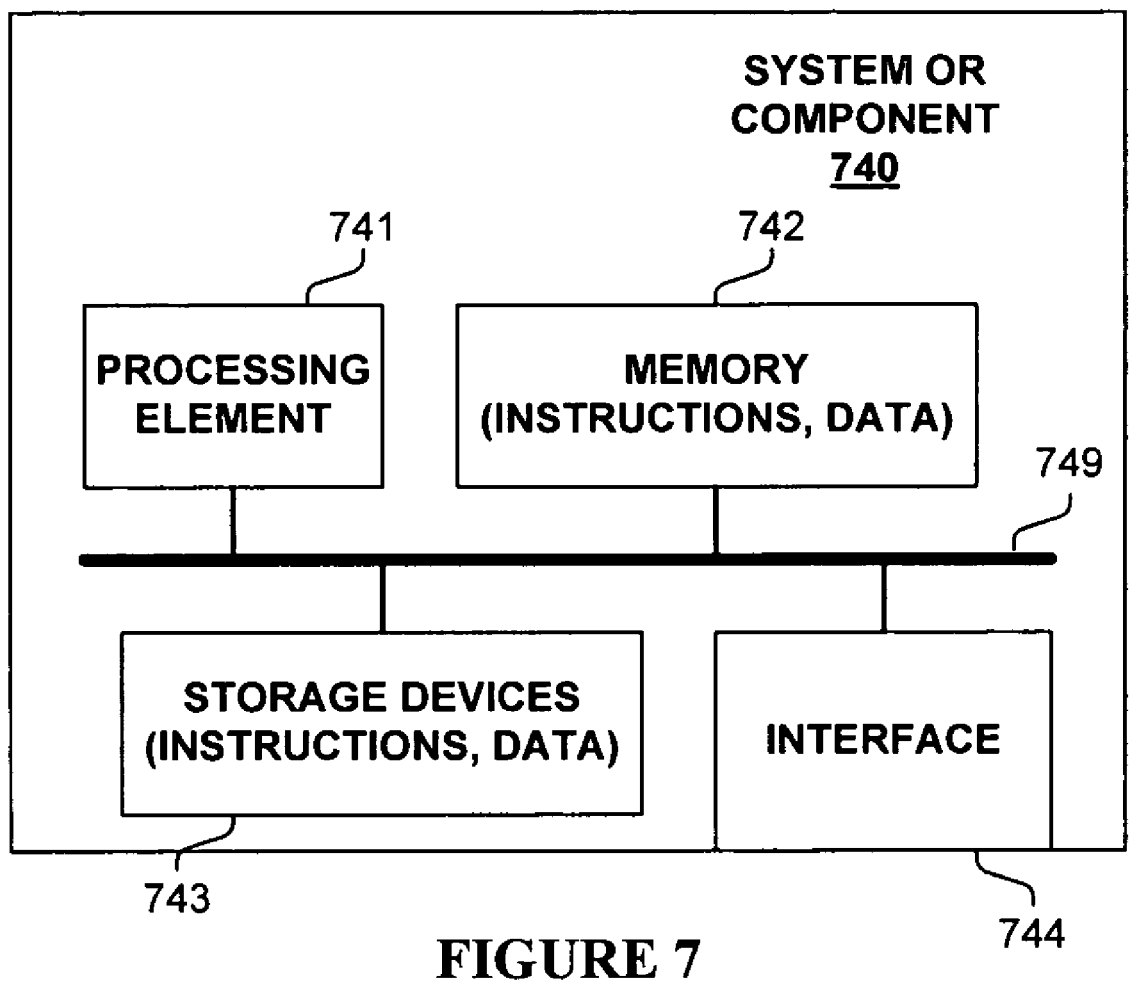
FIG. 7 is a block diagram of a system or component used in one embodiment.

FIG. 7 is a block diagram of a system or component used in one embodiment, such as for, but not limited to, implementing one or more regular expression matching stages and/or pipelines. In one embodiment, system 740 includes a processing element 741, memory 742, storage devices 743, and one or more interfaces 744 for communicating with other elements, other components, and/or external devices. Processing element 741, memory 742, storage devices 743, and one or more interfaces 744 are typically coupled via one or more communications mechanisms 749 (shown as a bus for illustrative purposes). Various embodiments of system 740 may include more or less elements.

The operation of system 740 is typically controlled by processing element 741 using memory 742 and storage devices 743 to perform one or more tasks or processes, such as, but not limited to, that illustrated in one or more of the figures. Memory 742 is one type of computer-readable medium, and typically comprises random access memory (RAM), read only memory (ROM), flash memory, integrated circuits, and/or other memory components. Memory 742 typically stores computer-executable instructions to be executed by processing element 741 and/or data which is manipulated by processing element 741 for implementing functionality in accordance with the invention. Storage devices 743 are another type of computer-readable medium, and typically comprise solid state storage media, disk drives, diskettes, networked services, tape drives, and other storage devices. Storage devices 743 typically store computer-executable instructions to be executed by processing element 741 and/or data which is manipulated by processing element 741 for implementing functionality in accordance with the invention.

Figure 8:
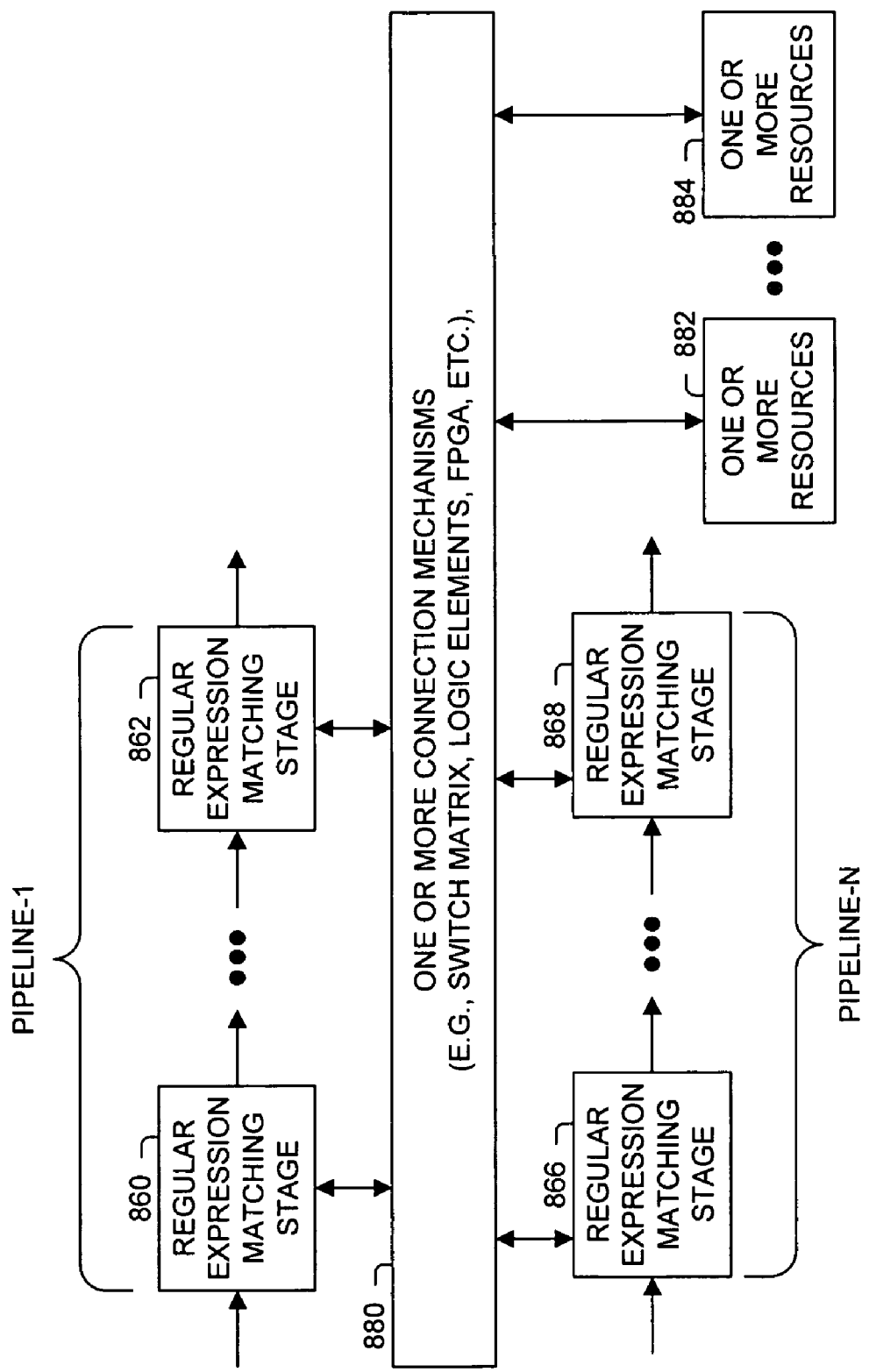
FIG. 8 is a block diagram illustrating one embodiment of a regular expression matching mechanism with multiple regular expression matching mechanisms and resources communicatively coupled via a communications mechanism.

FIG. 8 is a block diagram illustrating one embodiment of a regular expression matching mechanism with multiple regular expression matching mechanisms and resources communicatively coupled via a communications mechanism used in one embodiment. Shown are a pipeline including regular expression matching stages 860-862, a pipeline including regular expression matching stages 866-868, one or more resources and 882-884, communicatively coupled to one or more connection mechanisms 880 for selectively coupling these stages, pipelines, and/or resources in a configuration to support the evaluation of one or more regular expressions. One or more connection mechanisms 880 may include any communication mechanism, such as, but not limited to, a switching matrix, logic elements (e.g., discrete logic, multiplexers), field-programmable gate arrays (FPGA), etc.

Figure 9:
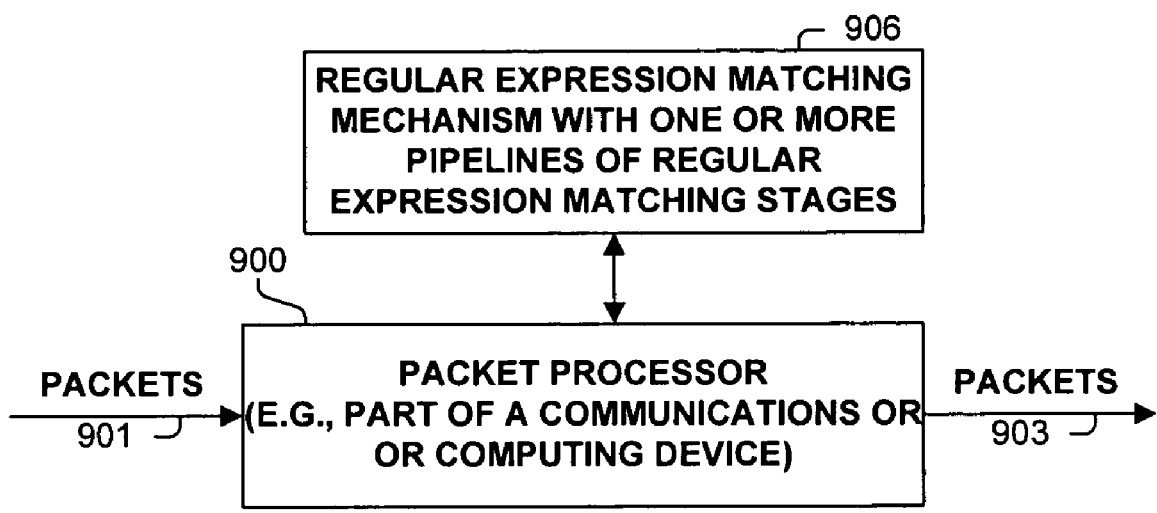
FIG. 9 is block diagram illustrating a device responsive to a regular expression matching mechanism of one embodiment.

FIG. 9 is block diagram illustrating a device responsive to a regular expression matching mechanism of one embodiment. For illustrative purposes, a packet processor 900 is shown as the device. Of course, a regular expression matching mechanism with or more pipelines of regular expression matching stages could be used with an extensible and unlimited number of different devices. As shown, packets 901 are received by packet processor 900 (e.g., part of a communications or computing device). Sequences of characters are extracted from the received packets and communicated to regular expression matching mechanism 906, which identifies whether or not one or more predefined regular expressions have been matched. Packet processor 900 accordingly processes these packets, such as dropping packets and/or forwarding packets 903.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for identifying whether or not a sequence of characters matches a regular expression, the apparatus comprising:

a plurality of regular expression matching stages connected together in a pipeline manner, with each of said regular expression matching stages corresponding to a different sequential portion of the regular expression; wherein said regular expression matching stages include a first stage followed by a plurality of middle stages followed by a final stage;

wherein each of said regular expression matching stages is configured to receive characters in the sequence of characters and to process said received characters in order to identify whether or not a current character in the sequence of characters results in a match of said regular expression matching stage's respective said portion of the regular expression;

wherein the first stage is configured to indicate to a first middle stage of said middle stages in said pipeline of the regular expression matching stages when said first stage said identifies that the current character results in a match of the first stage's respective said portion of the regular expression;

wherein each middle stage of said middle stages is configured to indicate to a next stage in said pipeline of the regular expression matching stages when said middle stage said identifies that the current results in a match of said middle stage's respective said portion of the regular expression and all previous stages in said pipeline of the regular expression matching stages have identified that corresponding previous characters in the sequence of characters have resulted in matching corresponding said portions of the regular expression; and the final stage is configured to indicate when the final stage matches the current character and all previous stages in said pipeline of the regular expression matching stages have identified that corresponding previous characters in the sequence of characters have resulted in matching corresponding said portions of the regular expression so as to identify that the regular expression is matched by the sequence of characters.

2. The apparatus of claim 1, wherein said sequential portions of the regular expression each consists of a single character.

3. The apparatus of claim 1, wherein at least one particular regular expression matching stage of said regular expression matching stages is responsive to a counting mechanism such that a current character does not result in the match of said at least one particular regular expression matching stage's respective said portion of the regular expression until the counting mechanism identifies that said respective said portion has been matched a predetermined number of consecutive times greater than one.

4. The apparatus of claim 1, comprising a packet processor for processing a packet including the sequence of characters based on said identification by the final stage of whether or not the regular expression is matched by the sequence of characters.

5. The apparatus of claim 1, wherein said portion of the regular expression of at least one of said regular expression matching stages consists of matching a single character.

6. The apparatus of claim 1, wherein said respective portion of the regular expression of at least one of said regular expression matching stages includes the operation of identifying matching a specified character.

7. The apparatus of claim 1, wherein at least one of said regular expression matching stages is configured to identify whether or not a specified character in said at least one regular expression matching stage's said respective portion of the regular expression is matched by the current character as part of said identification of whether or not the current character in the sequence of characters results in said match of said at least one regular expression matching stage's said respective portion of the regular expression.

8. The apparatus of claim 1, wherein at least one of said regular expression matching stages is configured to identify whether or not a specified character in said at least one regular expression matching stage's said respective portion of the regular expression is matched by the current character in response to receiving said indication from said at least one regular expression matching stage's immediately preceding stage of said regular expression matching stages that said at least one regular expression matching stage and all of said at least one regular expression matching stage's preceding stages, if any, have said identified that corresponding previous characters in the sequence of characters have resulted in matching said respective portions of the regular expression.

9. The apparatus of claim 1, wherein said respective portion of the regular expression of at least one of said regular expression matching stages includes the operation of identifying matching a specified character exactly zero or one times.

10. The apparatus of claim 1, wherein at least one of said regular expression matching stages is configured to identify whether or not a specified character in said at least one regular expression matching stage's said respective portion of the regular expression is matched exactly zero or one times by the current character as part of said identification of whether or not the current character in the sequence of characters results in said match of said at least one regular expression matching stage's said respective portion of the regular expression.

11. The apparatus of claim 1, wherein at least one of said regular expression matching stages is configured to identify whether or not a specified character is matched exactly zero or one times by successive characters in the sequence of characters in response to receiving said indication from said at least one regular expression matching stage's immediately preceding stage of said regular expression matching stages that said at least one regular expression matching stage and all of said at least one regular expression matching stage's previous stages, if any, have said identified that corresponding previous characters in the sequence of characters have resulted in matching said respective portions of the regular expression.

12. The apparatus of claim 1, wherein said respective portion of the regular expression of at least one of said regular expression matching stages includes the operation of identifying matching a specified character exactly one or more times by consecutive characters in the sequence of characters.

13. The apparatus of claim 1, wherein at least one of said regular expression matching stages is configured to identify whether or not a specified character is matched exactly one or more times by successive characters in the sequence of characters as part of said identification of whether or not the current character in the sequence of characters results in a match of said at least one regular expression matching stage's said respective portion of the regular expression.

14. The apparatus of claim 1, wherein at least one of said regular expression matching stages is configured to identify whether or not a specified character is matched exactly one or more times by successive characters in the sequence of characters in response to receiving said indication from said at least one regular expression matching stage's immediately preceding stage of said regular expression matching stages that said at least one regular expression matching stage and all of said at least one regular expression matching stage's previous stages, if any, have said identified that corresponding previous characters in the sequence of characters have resulted in matching said respective portions of the regular expression.

15. The apparatus of claim 1, wherein said respective portion of the regular expression of at least one of said regular expression matching stages includes the operation of identifying matching a specified character exactly zero or more times by consecutive characters in the sequence of characters.

16. The apparatus of claim 1, wherein at least one of said regular expression matching stages is configured to identify whether or not a specified character is matched exactly zero or more times by successive characters in the sequence of characters as part of said identification of whether or not the current character in the sequence of characters results in a match of said at least one regular expression matching stage's said respective portion of the regular expression.

17. The apparatus of claim 1, wherein at least one of said regular expression matching stages is configured to identify whether or not a specified character is matched exactly zero or more times by successive characters in the sequence of characters in response to receiving said indication from said at least one regular expression matching stage's immediately preceding stage of said regular expression matching stages that said at least one regular expression matching stage and all of said at least one regular expression matching stage's previous stages, if any, have said identified that corresponding previous characters in the sequence of characters have resulted in matching said respective portions of the regular expression.

18. The apparatus of claim 1, wherein said respective portion of the regular expression of at least one of said regular expression matching stages includes the operation of identifying not matching a specified character.

19. The apparatus of claim 1, wherein at least one of said regular expression matching stages is configured to identify whether or not a specified character is not matched by the current character as part of said identification of whether or not the current character in the sequence of characters results in a match of said at least one regular expression matching stage's said respective portion of the regular expression.

20. The apparatus of claim 1, wherein at least one of said regular expression matching stages is configured to identify whether or not a specified character is not matched by the current character in response to receiving said indication from said at least one regular expression matching stage's immediately preceding stage of said regular expression matching stages that said at least one regular expression matching stage and all of said at least one regular expression matching stage's previous stages, if any, have said identified that corresponding previous characters in the sequence of characters have resulted in matching said respective portions of the regular expression.

21. The apparatus of claim 1, wherein said respective portion of the regular expression of at least one of said regular expression matching stages includes the operation of identifying matching the upper or lower case of a specified character.

22. The apparatus of claim 1, wherein at least one of said regular expression matching stages is configured to identify whether or not the upper or lower case of a specified character in said at least one regular expression matching stage's said respective portion of the regular expression is matched by the current character as part of said identification of whether or not the current character in the sequence of characters results in said match of said at least one regular expression matching stage's said respective portion of the regular expression.

23. The apparatus of claim 1, wherein at least one of said regular expression matching stages is configured to identify whether or not the upper or lower case of a specified character in said at least one regular expression matching stage's said respective portion of the regular expression is matched exactly one time by the current character in response to receiving said indication from said at least one regular expression matching stage's immediately preceding stage of said regular expression matching stages that said at least one regular expression matching stage and all of said at least one regular expression matching stage's previous stages, if any, have said identified that corresponding previous characters in the sequence of characters have resulted in matching said respective portions of the regular expression.

24. The apparatus of claim 1, wherein the regular expression includes the operation of matching one of a set of two or more different characters.

25. The apparatus of claim 1, wherein at least one of said regular expression matching stages is configured to identify whether or not said at least one regular expression matching stage results in a match of said at least one regular expression matching stage's said respective portion of the regular expression based on an OR operation of: (a) said matching result of said at least one regular expression matching stage's said respective portion of the regular expression with the current character; and (b) said matching result of one or more of said at least one regular expression matching stage's immediately preceding regular expression matching stages matching said one or more immediately preceding regular expression matching stages' respective said portions of the regular expression with the current character.

26. The apparatus of claim 1, wherein at least one of said regular expression matching stages is configured to identify whether or not said at least one regular expression matching stage results in a match of said at least one regular expression matching stage's said respective portion of the regular expression based on an OR operation of: (a) said matching result of said at least one regular expression matching stage's said respective portion of the regular expression with the current characters, and (b) said matching result of one or more of said at least one regular expression matching stage's immediately preceding regular expression matching stages matching said one or more immediately preceding regular expression matching stages' said respective portions of the regular expression with the current character in response to the earliest stage of said or more of said at least one regular expression matching stage's immediately preceding regular expression matching stages receiving said indication from said at least one regular expression matching stage's immediately preceding stage of said regular expression matching stages that said at least one regular expression matching stage and all of said at least one regular expression matching stage's previous stages, if any, have said identified that corresponding previous characters in the sequence of characters have resulted in matching said respective portions of the regular expression.

27. An apparatus for identifying whether or not a sequence of characters matches one or more regular expressions, the apparatus comprising:

a first regular expression matching pipeline including a plurality of first regular expression matching stages, each of said first regular expression matching stages programmed to match corresponding portions of said regular expressions, with each of said first regular expression matching stages connected together in a pipeline manner, wherein each particular first matching stage of said first regular expression matching stages is responsive to the sequence of characters and said particular first matching stage's said programming, as well a match indication from said particular first matching stage's immediately preceding said regular expression matching stage in the first regular expression matching pipeline if said particular first matching stage has an immediately preceding said regular expression matching stage in the first regular expression matching pipeline, for identifying whether or not to generate a match indication for indicating that said particular first matching stage and all of said particular first matching stage's preceding said regular expression matching stages in the first regular expression matching pipeline have identified a match for corresponding characters in the sequence of characters;

a second regular expression matching pipeline including a plurality of second regular expression matching stages, each of said second regular expression matching stages programmed to match corresponding portions of said regular expressions, with each of said second regular expression matching stages connected together in a pipeline manner, wherein each particular second matching stage of said second regular expression matching stages is responsive to the sequence of characters and said particular second matching stage's said programming, as well a match indication from said particular second matching stage's immediately preceding said regular expression matching stage in the second regular expression matching pipeline if said particular second matching stage has an immediately preceding said regular expression matching stage in the second regular expression matching pipeline, for identifying whether or not to generate a match indication for indicating that said particular second matching stage and all of said particular second matching stage's preceding said regular expression matching stages in the second regular expression matching pipeline have identified a match for corresponding characters in the sequence of characters; and a connection mechanism responsive to an identification of a selected one of said first regular expression matching stages, wherein the connection mechanism is configured to selectively connect the second regular expression matching pipeline to said selected one of said first regular expression matching stages such that said selected one of said first regular expression matching stages is further responsive to the second regular expression matching pipeline in identifying whether or not to generate said selected one of said first regular expression matching stages' said match indication.

28. The apparatus of claim 27, wherein the connection mechanism is configured to selectively not connect the second regular expression matching pipeline to any said first regular expression matching stages such that the first and second regular expression matching pipelines operate independently on two different regular expressions.

29. The apparatus of claim 27, wherein said selected one of said first regular expression matching stages is responsive to a mechanism for identifying whether or not the second regular expression pipeline identifies a predetermined number of times greater than one that all said second regular expression matching stages have identified as being matched for corresponding characters in the sequence of characters.

30. The apparatus of claim 29, wherein said selected one of said first regular expression matching stages will not identify to said selected one of said first regular expression matching stages' immediately succeeding stage in said first regular expression matching stages until the mechanism identifies that all said second regular expression matching stages have identified as being matched for corresponding characters in the sequence of characters.

31. The apparatus of claim 27, comprising a packet processor for processing a packet including the sequence of characters based on said identification by the first regular expression matching pipeline of whether or not the regular expression is matched by the sequence of characters.

32. A method, implemented using one or more hardware components, performed by each particular regular expression matching stage of a plurality of regular expression matching stages connected together in a pipeline manner that has an immediately preceding regular expression matching stage in said pipeline of regular expression matching stages, the method comprising: in response to said immediately preceding regular expression matching stage to said particular regular expression matching stage in said pipeline of said regular expression matching stages identifying that said particular regular expression matching stage and all of said particular regular expression matching stage's preceding said regular expression matching stages in said pipeline of said regular expression matching stages have identified a match of respective portions of a regular expression for corresponding characters a sequence of characters and determining that a current character in the sequence of characters results in a match of a corresponding portion of the regular expression corresponding to said particular regular expression matching stage, communicating to a next regular expression matching stage in the pipeline of regular expression matching stages or to another device that the portion of the regular expression corresponding to the plurality of regular expression matching stages is matched for the sequence of characters through the current character.

33. The method of claim 32, comprising a packet processor communicatively coupled to said regular expression pipeline receiving an indication that the plurality of regular expression matching stages identified that the portion of the regular expression corresponding to the plurality of regular expression matching stages is matched for the sequence of characters through the current character; and in response to said indication, processing a packet including the sequence of characters based on said identification by the plurality of regular expression matching stages.

34. An apparatus for identifying whether or not a sequence of characters matches one or more regular expressions, the apparatus comprising a first regular expression matching pipeline including a plurality of first regular expression matching stages; wherein each of said first regular expression matching stages are programmed to match corresponding portions of said regular expressions, with each of said first regular expression matching stages connected together in a pipeline manner; wherein each particular first matching stage of said first regular expression matching stages includes: means for receiving the sequence of characters and a match indication from said particular first matching stage's immediately preceding said regular expression matching stage in the first regular expression matching pipeline if said particular first matching stage has an immediately preceding said regular expression matching stage in the first regular expression matching pipeline; and means for identifying whether or not to generate a match indication for indicating that said particular first matching stage and all of said particular first matching stage's preceding said regular expression matching stages in the first regular expression matching pipeline have identified a match for corresponding characters in the sequence of characters.

35. The apparatus of claim 34, comprising: a second regular expression matching pipeline including a plurality of second regular expression matching stages, each of said second regular expression matching stages programmed to match corresponding portions of said regular expressions, with each of said second regular expression matching stages connected together in a pipeline manner, wherein each particular second matching stage of said second regular expression matching stages includes: means for receiving the sequence of characters and a match indication from said particular second matching stage's immediately preceding said regular expression matching stage in the second regular expression matching pipeline if said particular second matching stage has an immediately preceding said regular expression matching stage in the second regular expression matching pipeline; and means for identifying whether or not to generate a match indication for indicating that said particular second matching stage and all of said particular second matching stage's preceding said regular expression matching stages in the second regular expression matching pipeline have identified a match for corresponding characters in the sequence of characters; and means for connecting the second regular expression pipeline to the first regular expression pipeline; wherein said means for identifying whether or not to generate a match indication of at least one of said first regular expression matching stages is further responsive to the second regular expression matching pipeline.

36. The apparatus of claim 35, comprising a packet processor for processing a packet including the sequence of characters based on said identification by the first regular expression matching pipeline of whether or not the regular expression is matched by the sequence of characters.

37. The apparatus of claim 34, comprising a packet processor for processing a packet including the sequence of characters based on said identification by the first regular expression matching pipeline of whether or not the regular expression is matched by the sequence of characters.

* * * * *

UNITED STATES PATENT AND TRADEMARK OFFICE
CERTIFICATE OF CORRECTION

PATENT NO. : 7,499,941 B2  Page 1 of 1
APPLICATION NO. : 11/220082
DATED : March 3, 2009
INVENTOR(S) : Michaeli et al.

It is certified that error appears in the above-identified patent and that said Letters Patent is hereby corrected as shown below:

Col. 22, line 13, replace "characters," with -- character --

Signed and Sealed this

Twenty-ninth Day of September, 2009

David J. Kappos
*Director of the United States Patent and Trademark Office*